United States Patent
Ambeskar et al.

(10) Patent No.: US 12,463,739 B2
(45) Date of Patent: Nov. 4, 2025

(54) GATEWAY TIMING REDUNDANCY ARCHITECTURE AND METHODS IN A PTP SYNCHRONIZED COMMUNICATION SYSTEM

(71) Applicant: HUGHES NETWORK SYSTEMS, LLC, Germantown, MD (US)

(72) Inventors: Nimesh Ambeskar, Germantown, MD (US); Patrick O'Neil, Germantown, MD (US); Jayant Ramakrishnan, Germantown, MD (US); Varsha Gorrepati, Germantown, MD (US); Sanhita Joshi, Germantown, MD (US)

(73) Assignee: HUGH NETWORKS SYSTEMS, LLC, Germantown, MD (US)

( * ) Notice: Subject to any disclaimer, the term of this patent is extended or adjusted under 35 U.S.C. 154(b) by 325 days.

(21) Appl. No.: 18/173,496

(22) Filed: Feb. 23, 2023

(65) Prior Publication Data

US 2024/0291580 A1 Aug. 29, 2024

(51) Int. Cl.
*H04J 3/06* (2006.01)
*H04B 7/185* (2006.01)
*H04W 56/00* (2009.01)

(52) U.S. Cl.
CPC ........ *H04J 3/0641* (2013.01); *H04B 7/18589* (2013.01); *H04J 3/0667* (2013.01); *H04W 56/001* (2013.01)

(58) Field of Classification Search
CPC ............. H04B 7/18589; H04B 7/18591; H04J 3/0641; H04J 3/0644; H04J 3/0652; H04J 3/0667; H04J 3/0688; H04J 3/14; H04W 56/001
See application file for complete search history.

(56) References Cited

U.S. PATENT DOCUMENTS

| | | | |
|---|---|---|---|
| 8,446,896 B2 * | 5/2013 | Bedrosian ............. | H04J 3/0697 370/348 |
| 8,576,883 B2 * | 11/2013 | Lansdowne ........... | H04J 3/0697 370/503 |

(Continued)

OTHER PUBLICATIONS

International Search Report and Written Opinion issued Jun. 24, 2024 in corresponding PCT/US2024/015906.

*Primary Examiner* — Alpus Hsu

(74) *Attorney, Agent, or Firm* — NovoTech International PLLC

(57) ABSTRACT

A redundant architecture for a Precision Time Protocol (PTP) network includes a plurality of PTP grandmaster clocks that provide first timing messages to a plurality of PTP aware switches based on a timing reference. The PTP aware switches determine respective first timing offsets based on the timing messages received from a primary grandmaster clock and provide second timing messages to an end node of the network based on the first timing offsets. The end node determines a second timing offset for the end node based on the second timing messages received from a primary PTP aware switch and adjusts its clock based on the second timing offset. When a failure of the primary grandmaster clock and/or the primary PTP aware switch is detected, a different grandmaster clock and/or a different PTP aware switch is designated as the primary grandmaster clock and the primary PTP aware switch, respectively.

14 Claims, 14 Drawing Sheets

(56) References Cited

U.S. PATENT DOCUMENTS

| | | | |
|---|---|---|---|
| 8,837,532 B2* | 9/2014 | Miyabe | H04J 3/0697 |
| | | | 370/503 |
| 8,976,778 B2* | 3/2015 | Bedrosian | H04J 3/0667 |
| | | | 370/348 |
| 9,270,395 B2 | 2/2016 | Zheng et al. | |
| 9,819,541 B2* | 11/2017 | Garg | H04L 45/20 |
| 10,129,844 B2* | 11/2018 | Wang | H04L 7/0087 |
| 10,666,372 B2* | 5/2020 | Goel | H04J 3/0682 |
| 11,323,195 B2 | 5/2022 | Ambeskar et al. | |
| 2015/0127978 A1 | 5/2015 | Cui et al. | |
| 2021/0028876 A1* | 1/2021 | Beardsley | H04J 3/0641 |
| 2021/0203427 A1* | 7/2021 | Ambeskar | H04J 3/0697 |
| 2022/0069932 A1* | 3/2022 | Beardsley | H04N 21/64322 |
| 2023/0370984 A1* | 11/2023 | Ambeskar | G04R 20/04 |

* cited by examiner

GATEWAY TIMING REDUNDANCY ARCHITECTURE AND METHODS IN A PTP SYNCHRONIZED COMMUNICATION SYSTEM

TECHNICAL FIELD

The present disclosure is directed to satellite communication systems, and, in particular, to timing synchronization architectures for satellite communication systems.

BACKGROUND

Satellite communication systems have emerged as an option for users to establish communication to terrestrial data networks, such as the Internet. Satellite communication systems typically utilize remote terminals or very small aperture terminals (VSATs) at the user locations. The remote terminals allow users to access the terrestrial data networks. The remote terminals are associated with a gateway or ground station which provides a point of connection to the terrestrial data networks for the satellite communication system.

With the satellite communication system, inroute subsystem uses Time-division Multiple Access (TDMA) time slots to allocate bandwidth among the remote terminals. A frame is a standard unit of time period for distributing the bandwidth in distinct time slots among the remote terminals. Frame and timing synchronization is an essential part for the functioning of TDMA based inroute on the satellite communication systems. It is required to synchronize the allocation of the inroute bandwidth to the remote terminals and synchronize transmission of data (by the remote terminals) and reception of data at the gateway receivers (demodulators). Signal frequency synthesis and synchronization are also important parts of the system One method used to provide frame and timing synchronization involves the use of the IEEE 1588 Precision Time Protocol (PTP). The PTP defines a standardized method for synchronizing clocks over a network. PTP synchronization (i.e., synchronization according to IEEE 1588) involves a predetermined exchange of messages including a SYNC message, a DELAY_REQ message, and a DELAY_RESP message (the messages also being referred to as "packets" or "frames"). The exchange is initiated by the master clock and yields four timestamps, which are commonly identified using the identifiers t1, t2, t3 and t4 (or, in some references, as T1, T1', T2 and T2' respectively). The first two timestamps t1 and t2 indicate a time of transmission and a time of receipt, respectively, of a message sent from the master clock to the slave clock. The second two timestamps t3 and t4 indicate a time of transmission and a time of receipt, respectively, of a message sent in the opposite direction, from the slave clock to the master clock.

The slave clock uses the timestamps t1, t2, t3 and t4 to compute an offset between itself and the master clock. The offset represents the error in the slave clock timing/frequency which must be corrected to maintain synchronization with the master clock. This is done using a predetermined algorithm, defined in the IEEE 1588 standard, which is referred to herein as the "PTP clock offset algorithm." The relative simplicity of the PTP clock offset algorithm, i.e., requiring only timestamps t1, t2, t3 and t4 to compute the offset, is made possible by a number of assumptions upon which the algorithm is premised. One such assumption is that the propagation delay of a message traveling over a network between the master clock and the slave clock is the same in both directions.

Once the slave clock has computed the offset using the PTP clock offset algorithm, the slave clock adjusts itself to eliminate the offset. In this way, each slave clock independently synchronizes itself with the master clock. This may be done at periodic intervals. PTP is used in this manner to synchronize the clocks of the end nodes of the system, such as the inroute and outroute components of satellite gateways.

While PTP is effective in providing precise timing synchronization for satellite communication systems, components of a PTP network, such as grandmaster clocks and switches, can fail resulting in synchronization errors, outages and other communication faults. In some systems, multiple PTP networks may be provided so that when a failure of one PTP network is detected, the system may switch over to a standby PTP network for timing synchronization. Each standby PTP network provides an additional communication path for synchronizing the end nodes of the network with a timing reference. However, each PTP network is still susceptible to failure if one of the components in the path breaks down.

Hence, there is a need for a PTP network having increased reliability even when faced with component failure.

SUMMARY

In one general aspect, the instant disclosure presents a gateway for a satellite communication system. The gateway includes at least one modem including an outroute modulator and an inroute demodulator. The outroute modulator and the inroute demodulator have a frequency and timing derived from a timing synchronization signal. The gateway also includes a Precision Time Protocol (PTP) network for providing the timing synchronization signal to the at least one modem. The PTP network includes a plurality of PTP grandmaster clocks that are each synchronized to a timing reference, each of the PTP grandmaster clocks generating first timing messages based on the timing reference, wherein a first PTP grandmaster clock of the plurality of PTP grandmaster clocks is designated as a primary grandmaster clock. The PTP network also includes a plurality of PTP aware switches, each of the PTP aware switches being configured to: receive the PTP timing messages from each of the PTP grandmaster clocks, determine a respective first timing offset based on the PTP timing messages received from the primary grandmaster clock, and generate second timing messages based on the first timing offset. A first PTP aware switch of the plurality of PTP aware switches is designated as a primary PTP aware switch. The PTP network also includes a slave clock for the at least one modem that is configured to receive the second timing messages from each of the PTP aware switches, determine a second timing offset for the slave clock based on the second timing messages received from the primary grandmaster clock, and generate the timing synchronization signal for the at least one modem based on the second timing offset.

In yet another general aspect, the instant disclosure presents a method for synchronizing an end node of a PTP network with a grandmaster clock. The method includes providing first timing messages from each of a plurality of PTP grandmaster clocks to each of a plurality of PTP aware switches, the first timing messages each being based on a timing reference, wherein a first PTP grandmaster clock of the plurality of PTP grandmaster clocks is designated as a primary PTP grandmaster clock and a first PTP aware switch of the PTP aware switches is designated as a primary PTP aware switch; monitoring clock information of the primary PTP grandmaster clock to detect a failure of the primary grandmaster clock; in response to detecting the failure of the primary grandmaster clock, identifying a second PTP grandmaster clocks of the PTP grandmaster clocks as the primary PTP grandmaster clock; determining a respective first timing offset at each of the PTP aware switches based on the first timing messages received from the primary PTP grandmaster clock; generating second timing messages at each of the PTP aware switches based on the respective first timing offset; providing the second timing messages to the end node; detecting a failure of the first PTP aware switch at the end node; in response to detecting the failure of the first PTP aware switch, identifying a second PTP aware switch as the primary PTP aware switch; and determining a second timing offset at the end node based on the second timing messages received from the primary PTP aware switch.

In a further general aspect, the instant application describes a method of maintaining a standby local area network (LAN) interface of a PTP aware switch synchronized with at least one PTP grandmaster clock (GMC). The method includes driving a first timestamp counter of a first LAN interface and a second timestamp counter of a second LAN interface of the PTP aware switch based on a frequency reference generated by a switch master clock of the PTP aware switch, wherein the first LAN interface is initially an active LAN interface and the second LAN interface is the standby LAN interface; performing an initial synchronization process that includes receiving a PTP timing reference from the at least one PTP GMC; and synchronizing the first timestamp counter and the second timestamp counter with the PTP timing reference; determining a timing offset based on the PTP timing reference and a timestamp of the active LAN interface using a PTP application; and adjusting the frequency reference generated by the switch master clock based on the timing offset.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIG. 7A is a diagram of another exemplary embodiment of a PTP aware switch.

DETAILED DESCRIPTION

Figure 1:
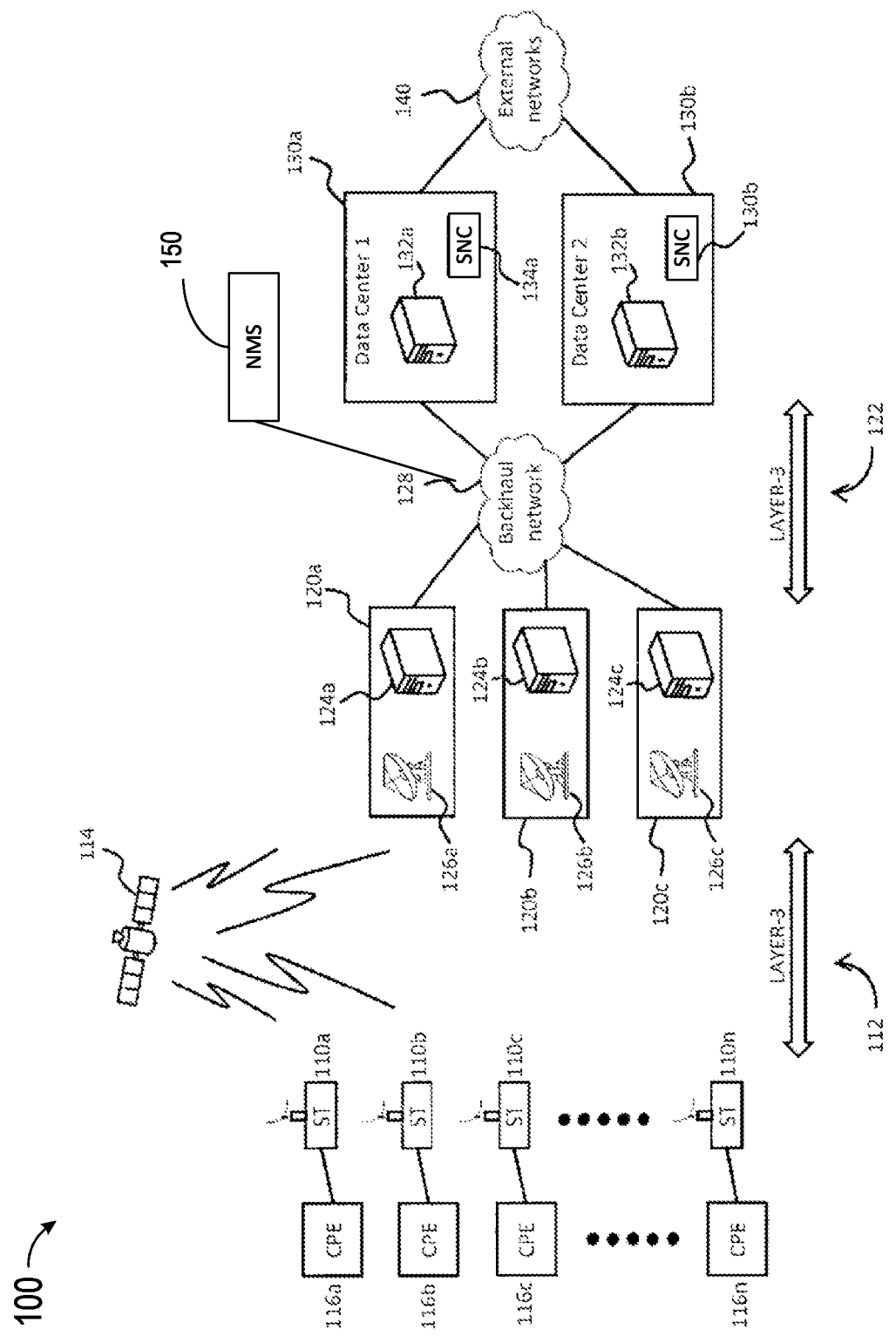
FIG. 1 depicts an example network design for a satellite system architecture upon which aspects of this disclosure may be implemented.

In the following detailed description, numerous specific details are set forth by way of examples in order to provide a thorough understanding of the relevant teachings. It will be apparent to persons of ordinary skill, upon reading this description, that various aspects can be practiced without such details. In other instances, well known methods, procedures, components, and/or circuitry have been described at a relatively high-level, without detail, in order to avoid unnecessarily obscuring aspects of the present teachings.

As discussed above, current satellite communication systems utilize PTP networks for providing timing and frequency synchronization to end nodes of the network, such as inroute and outroute components of modems and servers. In a PTP network, a grandmaster clock is synchronized to a timing reference, such as a Global Positioning System (GPS) constellation time provided by a GPS satellite. The grandmaster clock provides a timing reference to a boundary clock. A boundary clock is a slave clock to the grandmaster clock. The boundary clock determines a timing offset between itself and the grandmaster clock and synchronizes its clock to the grandmaster clock. The boundary clock serves as a master clock to a slave clock of an end node of the PTP network. The boundary clock provides a timing reference to the slave clock of the end node that is based on the timing of the boundary clock.

The slave clock of the end node then determines a timing offset for the end node relative to the boundary clock which in turn synchronizes the timing of the end node to the timing reference of the grandmaster clock. The boundary clock is typically implemented in a network packet switch which then distributes the clock reference to various connected end nodes.

Timing synchronization is critical in a satellite communication system. Previously known PTP networks are susceptible to failure if any component in a communication path between a grandmaster clock and an end node of the network fails. Such failures can result in synchronization errors, outages and other communication faults. In some systems, multiple PTP networks may be provided so that when a failure of one PTP network is detected, the system may switch over to a standby PTP network for timing synchronization. Each standby PTP network provides an additional communication path for synchronizing the end nodes of the network with a timing reference. However, each PTP network is still susceptible to failure if one of the components in the path breaks down.

To address these technical problems and more, in an example, this description provides technical solutions in the form of a redundant architecture for a PTP network for a satellite communication system. The redundant architecture enables multiple communication paths between grandmaster clocks and an end node of the PTP network to be used to provide PTP synchronization for the end node. The redundant architecture includes a plurality of PTP grandmaster clocks and a plurality of PTP aware switches. Each of the PTP grandmaster clocks is synchronized to the same timing reference and provides timing messages to each of the PTP aware switches based on the timing reference. Each of the PTP aware switches determines a respective timing offset based on the timing messages received from a primary grandmaster clock. When a failure of the primary grandmaster clock is detected, a different one of the PTP grandmaster clocks is identified as the primary grandmaster clock and the PTP aware switches determine the respective timing offsets based on the timing messages received from that grandmaster clock.

Each PTP aware switch generates timing messages for an end node of the PTP network based on the timing offset for the switch. The end node receives the timing messages from each of the PTP aware switches and determines a timing offset for the end node based on the timing message received from a primary PTP aware switch. If a fault or failure of the primary PTP aware switch is detected, the end node uses the timing messages from a different one of the PTP aware switches as the basis for determining the timing offset for the end node. In particular, the end node switches its network receive port to use the timing message from a different one of the PTP aware switches. Once the timing offset for the end node has been determined, the clock of the end node is adjusted based on the timing offset such that the clock is synchronized to the clock of the primary PTP aware switch and in turn to the clock of the primary grandmaster clock. In the case of a fault or failure of the primary PTP aware switch, the clock of the end node is adjusted based on the timing offset such that the clock is synchronized to the clock of the different one of the PTP aware switches.

The technical solutions described herein address the technical problem associated with previously known PTP networks by enabling multiple communication paths to be provided in a single PTP network between grandmaster clocks and an end node of the network. The number of communication paths depends on the number of grandmaster clocks and the number of PTP aware switches. In embodiments, the number of communication paths provided by the redundant architecture described herein corresponds to a product of the number of grandmaster clocks and the number of PTP aware switches. For example, for a redundant architecture having two grandmaster clocks and two PTP aware switches, four different communication paths (i.e., 2×2) may be utilized for synchronization of an end node. This has advantages over previously known systems that utilize standby PTP networks in which each network provides a single communication path for synchronization.

The technical solutions provided herein also provide a redundant architecture for PTP networks that minimize the failover time to switch from one communication path to another in case of a failure of a component, such as a grandmaster clock or a PTP aware switch or slave node network receive port, with a nearly hitless switch in terms of the inroute/outroute physical layer packet loss. The grandmaster clocks monitor each other to detect clock degradation and failures. When a failure of a primary grandmaster clock is detected, a standby/redundant grandmaster clock takes over and provides an indication to the PTP aware switches of the new primary grandmaster clock. The PTP aware switches may then switch over their primary inputs to the new primary grandmaster clock, so the timing offset is generated based on the timing messages received from the new primary grandmaster clock. Similarly, the end node is capable of detecting failures, such as link fault failures, of the primary PTP aware switch at the input ports of the end node. Such failures may trigger an automatic switchover of the network receive port from a first (e.g., primary) PTP aware switch to a second (e.g., secondary) PTP aware switch for generating the timing offset for the end node.

FIG. 1 illustrates an example regionalized network architecture for a satellite system 100. The system 100 may include a plurality of terminals 110a to 110n, a number of regionalized RF gateways 120a to 120c, and one or more data centers 130a and 130b. The terminals 110 may communicate with the RF gateways 120 using a first layer-3 connection 112 that is established via a satellite 114. In one implementation, the satellite 114 is a VHTS. The terminals 110 can be located at various customer locations in order to provide access for different client devices 116 to transmit/receive information to/from the RF gateways 120. The client devices 116 may include various computing devices which can be used by a consumer to communicate and/or access external networks. For example, such client devices 116 may include computers, laptops, tablets, mobile phones, or any network-enabled device having a wired and/or wireless interface Depending on the specific geographic location of each terminal 110, satellite communication may be established between the terminal and the satellite 114 with the use of an RF gateway 120 which is positioned to service a satellite beam encompassing the location of the terminal 110. Each gateway 120 may correspond to a site in a geographic location defined by the satellite. In an example, each gateway 120 may support multiple antennas, transmitters and/or cabling to hardware components such as baseband equipment that can be used to control the transmitters and process the information received and transmitted.

In one implementation, each gateway 120 may include one or more computing systems 124 capable of interfacing with appropriate hardware to establish a link to a radio frequency transceiver 126. It should be noted that while FIG. 1 depicts a single computing system 124 within the RF gateways 120, multiple computing systems can be utilized. The computing systems 124 may include servers, desktop computers, laptops, custom hardware (e.g., modulators, demodulators, etc.), and the like which can be used to control different operations and devices associated with the gateway 120.

In one implementation, each RF gateway 120 is connected to a data center 130 via a connection 122. In an example, the connection 122 is a layer-3 connection which is established over a backhaul network 128 to reach the location of the data center 130. The data centers 130 may be regionalized by being located in various geographic areas, as needed to provide access to various external networks 140. The external networks 140 can include public networks (e.g., the internet) or private networks. Each data center 130 may include, for example, one or more computing systems 132 (e.g., desktop computers, laptops, servers, etc.) and a satellite network core (SNC) 134 (e.g., L2/L3 compute server/software components). Alternatively, the SNCs 134 may be located at geographical locations that are different than the data centers 130. Furthermore, the backhaul network 128 may be used for RF gateway to RF gateway traffic, SNC to SNC traffic, and SNC to external network traffic. By using SNCs 134 which are regionalized, functions of a traditional gateway may be distributed between the RF gateways 120 and the SNCs 134. The system 100 may also include an external network management system (NMS) 150. The NMS 150 may be responsible for managing all aspects of terminals within the system.

Figure 2:
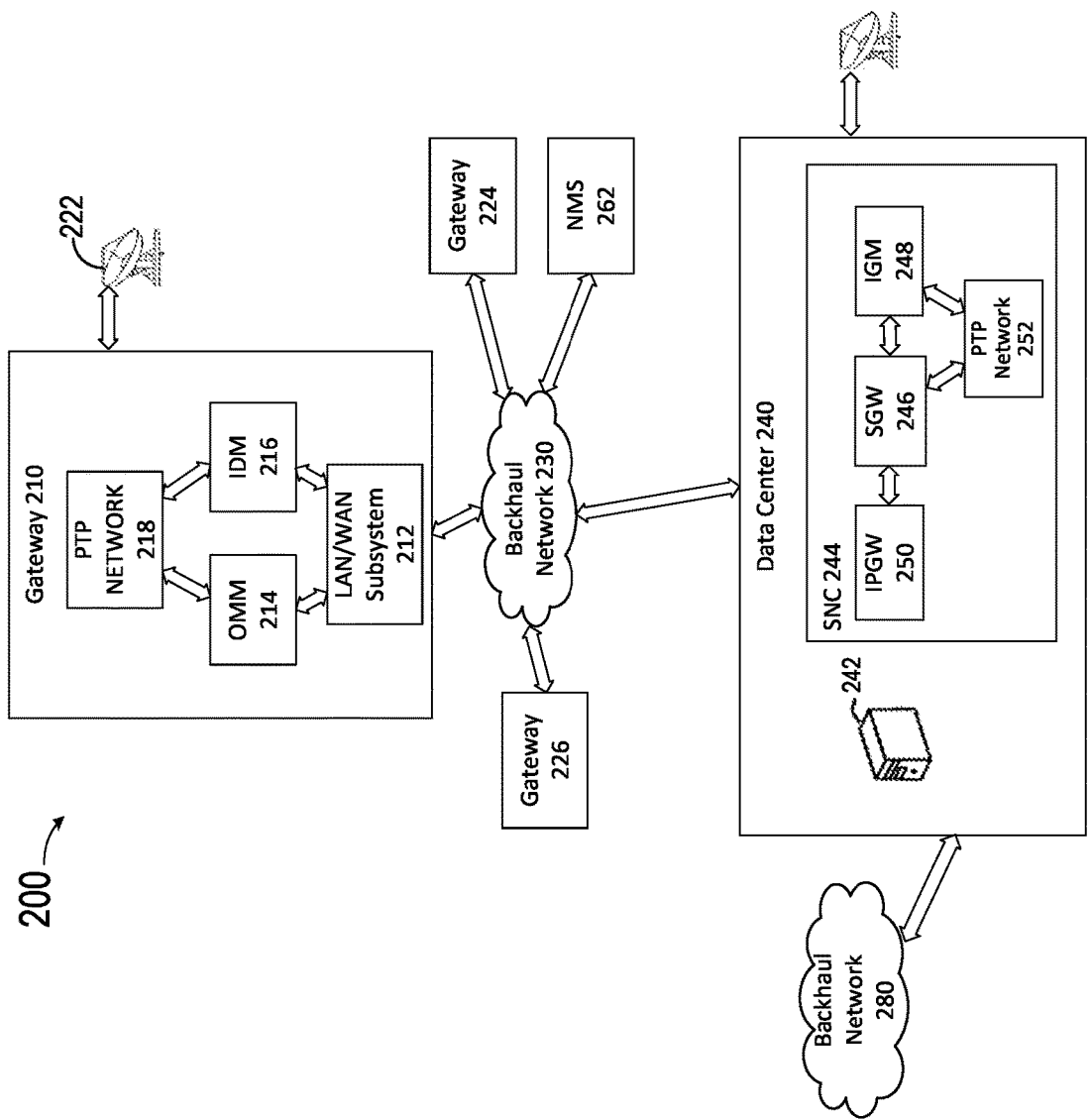
FIG. 2 depicts an example implementation of a satellite communication system for use in the satellite system architecture of FIG. 1.

FIG. 2 depicts a diagram illustrating some of the end-to-end details of an example network architecture 200 upon which aspects of this disclosure may be implemented. The network architecture 200 may include multiple RF gateways such as, gateway 210, gateway 224, and gateway 226. The network architecture may also include a plurality of data centers, although a single data center 240 is shown in FIG. 2. The gateways 210, 224, and 226 may comprise RF gateways. The data center 240 includes an SNC site 244.

Together, the gateways and the data centers may provide customer terminals access to external network 280. In one implementation, the gateway 210 includes a network subsystem, such as LAN/WAN subsystem 212 that is configured to provide connectivity to local (e.g., within the first gateway) and distant networks (e.g., outside the first gateway). For example, the LAN/WAN subsystem 212 can include multiple ethernet, optical, coaxial, and wireless interfaces which facilitate connectivity to local network devices, as well as external connectivity to a backhaul network 230 over a layer-3 connection.

In one implementation, the gateway 210 includes an outroute modulator module (OMM) 214 and an inroute demodulator module (IDM) 216 which may provide outroute and inroute subsystem operations. In one implementation, the radio frequency terminal (RFT) (not shown) and an RFT antenna 222 may also be located at the RF gateway locations. In embodiments, some operations that are traditionally performed by a gateway may be done by the SNCs in system 200. For example, one or more servers in the SNC 244 may include an outroute processor (ORP) (not shown), an inroute processor (IRP) (not shown) and/or internet protocol gateway (IPGW) 250. The IPGWs may perform functions such as TCP acceleration, header compression, payload compression, and the like and as such may include specialized hardware components configured to automatically perform such functions.

In one implementation, the IPGW 250 may interface with the outroute and inroute subsystems of the RF gateways. As a result, inroute group managers (IGM) 248 and satellite gateway (SGW) 246 may be located at the SNC 244. SGW 246 has a configuration similar to the gateways 210, 224, 226 which enables data center 240 to communicate directly over a satellite network. IGMs perform inroute processing and inroute bandwidth allocation. The IGMs manage bandwidth in the form of inroute groups (IGs), based in part on bandwidth demand requests from remote terminals. The remaining transmission layer, however, may be located at the RF Gateway locations (e.g., gateways 210, 224 and 226) which may also contain one or more modems including the OMM 214 and IDM 216.

In an example, the gateways 224 and 226 are configured in substantially the same manner illustrated as the first gateway 210. It should be noted, however, that additional gateways can also be provided depending on the specific system implementation and requirements. Accordingly, the use of three gateways is only intended to be illustrative, and not restrictive.

In one implementation, the data center 240 may include a CPU 242 which can be programmed (or configured) to control various operations of the data center 240. Alternatively, multiple servers, desktop computers, laptops, and the like may be used alone, or in combination, for controlling various operations of the data center 240.

The system 200 may also include an external NMS 262 which is provided at a separate location from any data centers, such as data center 240. The NMS 262 may be responsible for managing all aspects of terminals within the system.

It should be noted that although, system 200 illustrates a system that only includes one data center, various implementations can incorporate additional data centers, as necessary, to optimize costs and speed of the system.

The RF gateways and SNCs each include a PTP network to provide frame and timing synchronization for inroute and outroute components of the system 200. In the embodiment of FIG. 2, the RF gateway 210 includes a PTP network 218, and the SNC includes PTP network 252. The PTP networks 218, 252 each utilize PTP synchronization to synchronize the clocks of the inroute and outroute devices of the system 200. PTP synchronization (i.e., synchronization according to IEEE 1588) involves a predetermined exchange of messages between a master clock and a slave clock. The exchange is initiated by the master clock and yields four transit time timestamps, e.g., t1, t2, t3 and t4. The first two timestamps t1 and t2 indicate a time of transmission and a time of receipt, respectively, of a message sent from the master clock to the slave clock. The second two timestamps t3 and t4 indicate a time of transmission and a time of receipt, respectively, of a message sent in the opposite direction, from the slave clock to the master clock. The slave clock uses the timestamps t1, t2, t3 and t4 to compute an offset between itself and the master clock. This is done using a predetermined algorithm, defined in the IEEE 1588 standard (referred to herein as the "PTP clock offset algorithm"). Once the slave clock has computed the offset using the PTP clock offset algorithm, the slave clock adjusts its clock to eliminate the offset. In this way, each slave clock independently synchronizes itself with the master clock. This may be done at periodic intervals.

Figure 3:
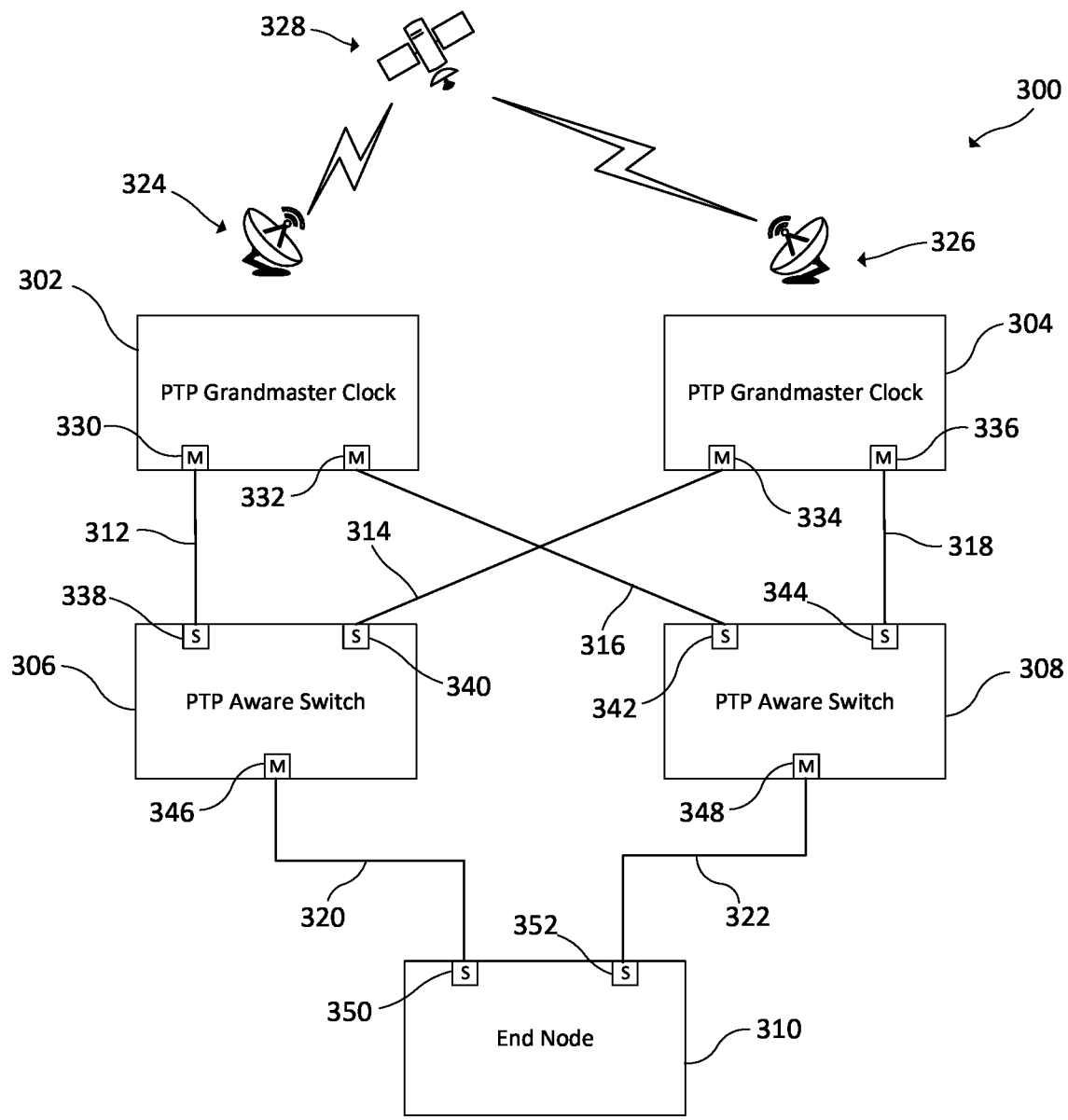
FIG. 3 shows an example implementation of a redundant architecture for a PTP network for system of FIG. 2.

FIG. 3 shows an example implementation of a PTP network 300 that may be utilized in the system 200 of FIG. 2. The PTP network 300 includes at least one PTP Grandmaster Clock 302, 304, at least one PTP aware switch 306, 308, and at least one end node 310. Each PTP grandmaster clock 302, 304 is synchronized to a primary time reference, such as a GPS or CDMA. In the embodiment of FIG. 3, the time reference is a GPS constellation time reference received from a GPS satellite 328 via a GPS antenna 324 or 326. In other embodiments, other sources for the primary timing reference may be used, such as an atomic clock.

Each PTP grandmaster clock 302, 304 is coupled to each PTP aware switch 306, 308 via a communication link via which the PTP grandmaster clocks provide timing messages to the PTP aware switches. The timing messages include timing information, such as transit time timestamps, based on the primary time reference. Each PTP aware switch 306, 308 utilizes the transit time timestamps to determine a first timing offset. Each PTP aware switch then adjusts its clock based on the first timing offset so that the PTP aware switch is synchronized to the PTP grandmaster clock.

The PTP aware switches 306, 308 are boundary clocks such that it acts as a slave clock to the PTP grandmaster clocks 302, 304 and a master clock to the downstream end node 310. As such, each PTP aware switch 306, 308 generates timing messages with transit time timestamps for the end node 310 with transmit time timestamps based on an offset time reference for the PTP aware switch. Each PTP aware switch 306, 308 is coupled to the end node 310 via a respective communication link via which the timing messages from the PTP aware switches are provided to the end node 310.

The end node 310 comprises an inroute and/or an outroute component of an RF gateway or SNC, such as the OMM 214 and IDM 216 of the RF Gateway 210 and inroute and outroute processors in the server(s) of the SNC. The end node is a slave node of the PTP network which receives the timing messages from the PTP aware switches and utilizes the transmit time timestamps in the messages to determine a second timing offset. The end node can then adjust its clock based on the second timing offset so that the end node 310 is synchronized to a PTP aware switch, and in turn synchronized to a PTP grandmaster clock.

Due to the critical nature of the timing synchronization for the clocks of the satellite communication system, the PTP network includes a redundancy architecture that protects the PTP network from the failure and/or degradation of a grandmaster clock and/or a PTP aware switch. The PTP Grandmaster clocks 302, 304, the PTP aware switches 306, 208, the end node 310, and the communication links provide a redundancy architecture for the PTP network that enables the PTP network to survive the degradation and/or failure of a grandmaster clock and/or a PTP aware switch by providing multiple communication paths for synchronizing the timing of the end node with a reference time.

In the embodiment of FIG. 3, the PTP network includes a first PTP grandmaster clock 302, a second PTP grandmaster clock 304, a first PTP aware switch 306, a second PTP aware switch 308, and an end node 310. The first PTP grandmaster clock 302 and the second PTP grandmaster clock 304 each receive the same primary time reference. In the embodiment of FIG. 3, the first PTP grandmaster clock and the second PTP grandmaster clock receive a primary time reference in the form of a GPS satellite time from a GPS satellite 328 via respective GPS antennas 324, 326.

The first PTP grandmaster clock 302 includes two output ports (also referred to as master ports) 330, 332 via which timing messages are transmitted from the first PTP grandmaster clock 302 to the PTP aware switches 306, 308. Similarly, the second PTP grandmaster clock 304 includes two output ports (also referred to as master ports) 334, 336 via which timing messages are transmitted from the second PTP grandmaster clock 304 to the PTP aware switches 306, 308.

The first and second PTP aware switches 306, 308 are configured to switch between the first and second PTP grandmaster clocks 302, 304 to enable multiple timing paths to be used to synchronize the timing to the end node 310. To this end, the first PTP aware switch 306 includes a first input port 338, a second input port 340 (also referred to as slave ports), and an output port 346 (i.e., a master port). The first input port 338 is coupled to the output port 330 of the first PTP grandmaster clock 302 by a communication link 312 which enables the timing messages from the first PTP grandmaster 302 to be received by the first PTP aware switch 306. The communication links described herein may be provided via wired or wireless networks or a combination of wired and wireless networks that connect one or more elements of the system. The second input port 340 is coupled to the output port 334 of the second PTP grandmaster clock 304 by a communication link 314 which enables the timing messages from the second PTP grandmaster 304 to be received by the first PTP aware switch 306. In embodiments, the input ports of the PTP aware switches comprise network interfaces, such as local area network (LAN) interfaces, and, in particular, comprise physical layer devices, such as ethernet transceivers (i.e., LAN PHYs). The devices include clocks which are synchronized to the grandmaster clock.

The second PTP aware switch 308 has a similar configuration as the first PTP aware switch 306. The second PTP aware switch 308 includes a first input port 342, a second input port 344 (also referred to as slave ports), and an output port 348 (i.e., a master port). The first input port 342 is coupled to the output port 332 of the first PTP grandmaster clock 302 by a communication link 316 which enables the timing messages from the first PTP grandmaster clock 302 to be received by the second PTP aware switch 308. The second input port 344 is coupled to the output port 336 of the second PTP grandmaster clock 304 by a communication link 318 which enables the timing messages from the second PTP grandmaster clock 304 to be received by the second PTP aware switch 308.

The end node 310 comprises an inroute and/or an outroute component of an RF gateway, such as a modulator or demodulator, or an SNC, such as an inroute and outroute processor of a server. In the embodiment of FIG. 3, the end node 310 includes two input ports (i.e., slave ports) 350, 352. The first input port 350 is coupled to the output port 346 of the first PTP aware switch 306 by a communication link 320 which enables the timing messages from the first PTP aware switch 306 to be received by the end node 310. The second input port 352 is coupled to the output port 348 of the second PTP aware switch 308 by a communication link 322 which enables the timing messages from the second PTP aware switch 308 to be received by the end node 310. Although a single end node 310 is shown in FIG. 3, the PTP network may provide timing synchronization for any suitable number of end nodes in which case each end node would have two input ports for respectively receiving the timing messages from the first and second PTP aware switches 306, 308.

Figure 4A:
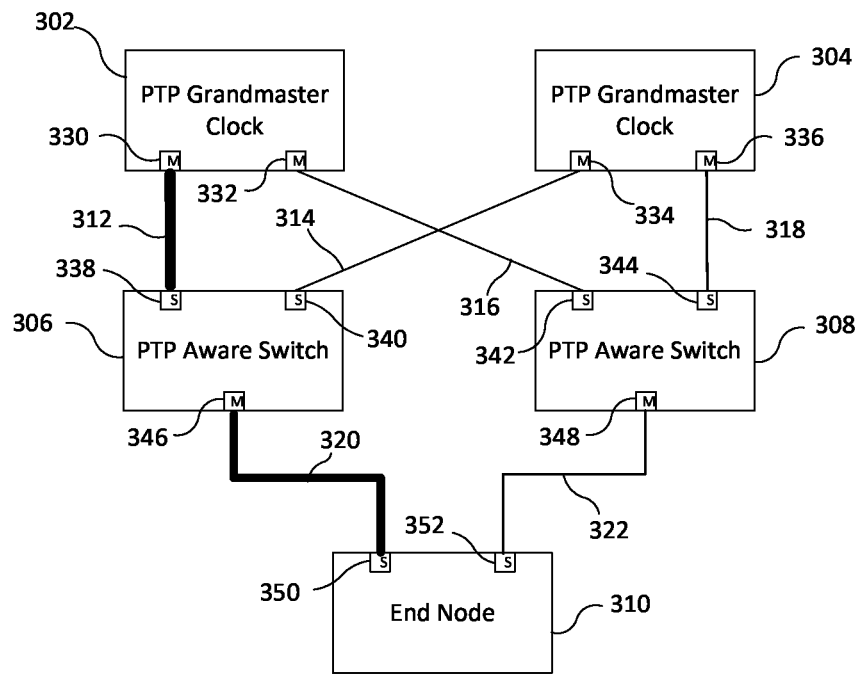
FIGS. 4A-4D show different communication paths for synchronizing an end node with a grandmaster clock enabled by the redundant architecture of FIG. 3.
Figure 4B:
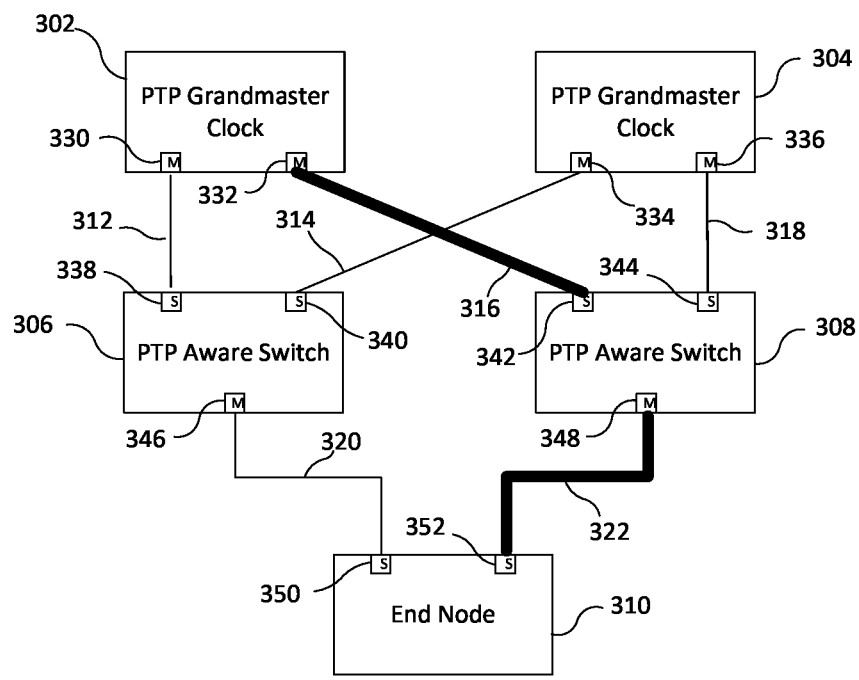
Figure 4C:
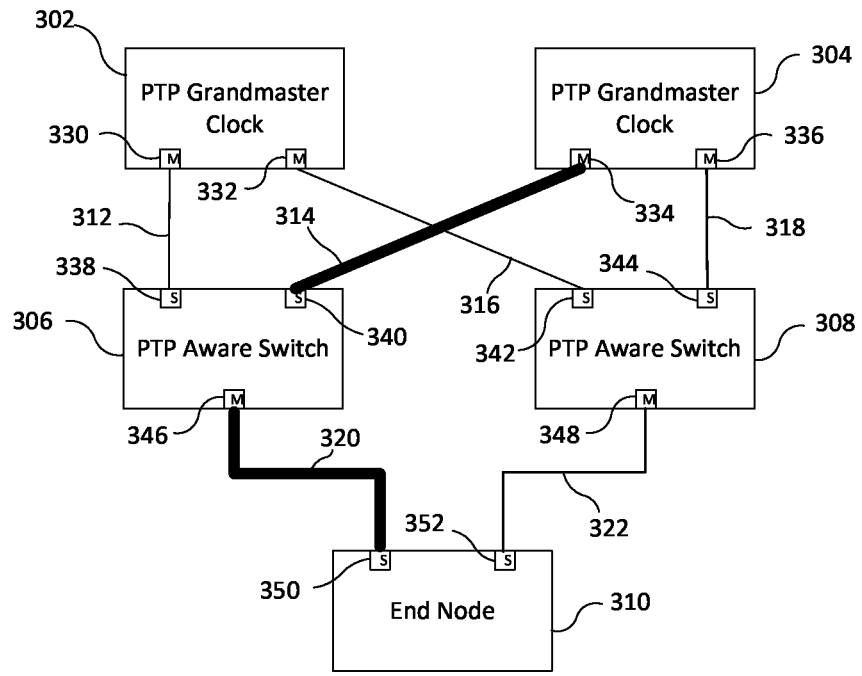
Figure 4D:
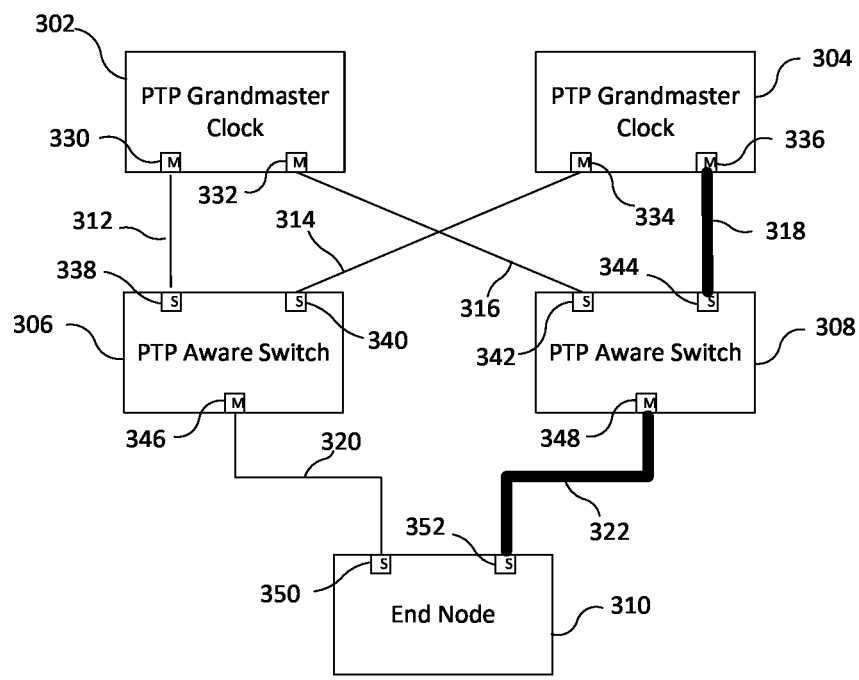

Coupling the timing messages from each grandmaster clock 302, 304 to each PTP aware switch 306, 308 enables multiple communication paths for synchronizing end nodes with a grandmaster clock. FIGS. 4A-4D show the different possible communication paths that may be used to synchronize the end node with the grandmaster clock. In FIG. 4A, the timing path is from the first PTP grandmaster 302 to the first PTP switch 306 via communication link 312, and from the first PTP switch 306 to the end node 310 via communication link 320. In FIG. 4B, the timing path is from the first PTP grandmaster 302 to the second PTP switch 308 via communication link 316, and from the second PTP switch 308 to the end node 310 via communication link 322. In FIG. 4C, the timing path is from the second PTP grandmaster clock 304 to the first PTP aware switch 306 via communication link 314, and from the first PTP aware switch 306 to the end node 310 via communication link 320. In FIG. 4D, the timing path is from the second PTP grandmaster 304 to the second PTP aware switch 308 via communication link 318, and from the second PTP switch 308 to the end node 310 via communication link 322.

In embodiments, one of the grandmaster clocks, e.g., the first PTP grandmaster clock 302, is initially designated as the primary grandmaster clock for the network, and any other grandmaster clock of the network, e.g., the second PTP grandmaster clock 304 is designated as a standby grandmaster clock. In embodiments, the grandmaster clocks 302, 304 broadcast their clocks and other parameters to each other which enables each grandmaster clock 302, 304 to detect clock degradation and other failures of other grandmaster clocks. The grandmaster clocks 302,304 are also configured to broadcast status information indicating that they are the primary grandmaster clock of the network. When a failure of the primary grandmaster clock is detected by a standby grandmaster clock, the standby grandmaster clock begins to broadcast itself as the primary grandmaster clock.

In the embodiment of FIG. 3, the first PTP grandmaster clock 302 and the second PTP grandmaster clock 304 broadcast their clocks and other parameters to each other. In addition, the first PTP grandmaster clock 302 broadcasts that it is the primary grandmaster clock of the network. The second PTP grandmaster clock 304 monitors the clock and other parameters of the first PTP grandmaster clock 302 for degradation or other failures. When a failure of the first PTP grandmaster clock 302 is detected, the second PTP grandmaster clock 304 begins to broadcast itself as the primary grandmaster clock for the network.

The input port of the PTP aware switches which is coupled to receive timing messages from the primary grandmaster clock corresponds to the primary port of the switch. In other words, the timing messages received via the primary port are used to determine the timing offset for the switch. In the embodiment of FIG. 3, when the first PTP grandmaster clock 302 is the primary grandmaster clock, the input port 338 of the first PTP aware switch 306 and the input port 342 of the second PTP aware switch 308 are the primary ports of the respective PTP aware switches 306, 308.

Coupling the timing messages from each grandmaster clock 302, 304 to each PTP aware switch 306, 308 enables the detection of grandmaster clock failure/degradation at the switch/boundary clock level which in turn enables a fast switch to the redundant grandmaster clock. For example, the PTP aware switches 306, 308 receive the broadcasts indicating which of the grandmaster clocks is currently the primary grandmaster clock. When the PTP aware switches receive a broadcast indicating that a new primary grandmaster clock has been designated, the PTP aware switches designate the input port coupled to the new primary grandmaster clock as the primary port for synchronization purposes. In the embodiment of FIG. 3, when the PTP aware switches receive the indication that the second PTP grandmaster clock is the primary clock of the network, the first PTP aware switch switches over the primary input from the input port 338 to input port 340, and the second PTP aware switch switches over the primary input from the input port 342 to the input port 344.

One of the PTP aware switches, e.g., the first PTP aware switch 306, is initially designated the primary PTP aware switch for synchronizing the end node 310. The other PTP aware switches, such as the second PTP aware switch 308, are designated standby switches for the network. The input node of the end node 310 that is coupled to the primary PTP aware switch is the primary input node, also referred as the active port, for the end node 310. Timing messages received via the active port are used as the basis for determining the timing offset for the node 310. In the embodiment of FIG. 3, when the first PTP aware switch 306 is the primary switch for the network, the input node 350 is the active port for the end node 310. When the second PTP aware switch 308 is the primary switch for the network, the input node 352 is the active port for the end node. The other port which is not currently the active port is designated as a hot standby port available for switchover.

In embodiments, switch failures may be detected in any suitable manner. For example, a switch failure or switch port failure may result in a link fault failure at the corresponding input port of the end node 310. Detection of a link fault failure at an active input port of an end node may automatically trigger a switchover of the active input port to the standby port. Similarly, a failure, such as a link fault failure or PHY/MNAC hardware fault alarm, at the active input port of an end node may automatically trigger a switchover of the active input port to the standby port.

Figure 5:
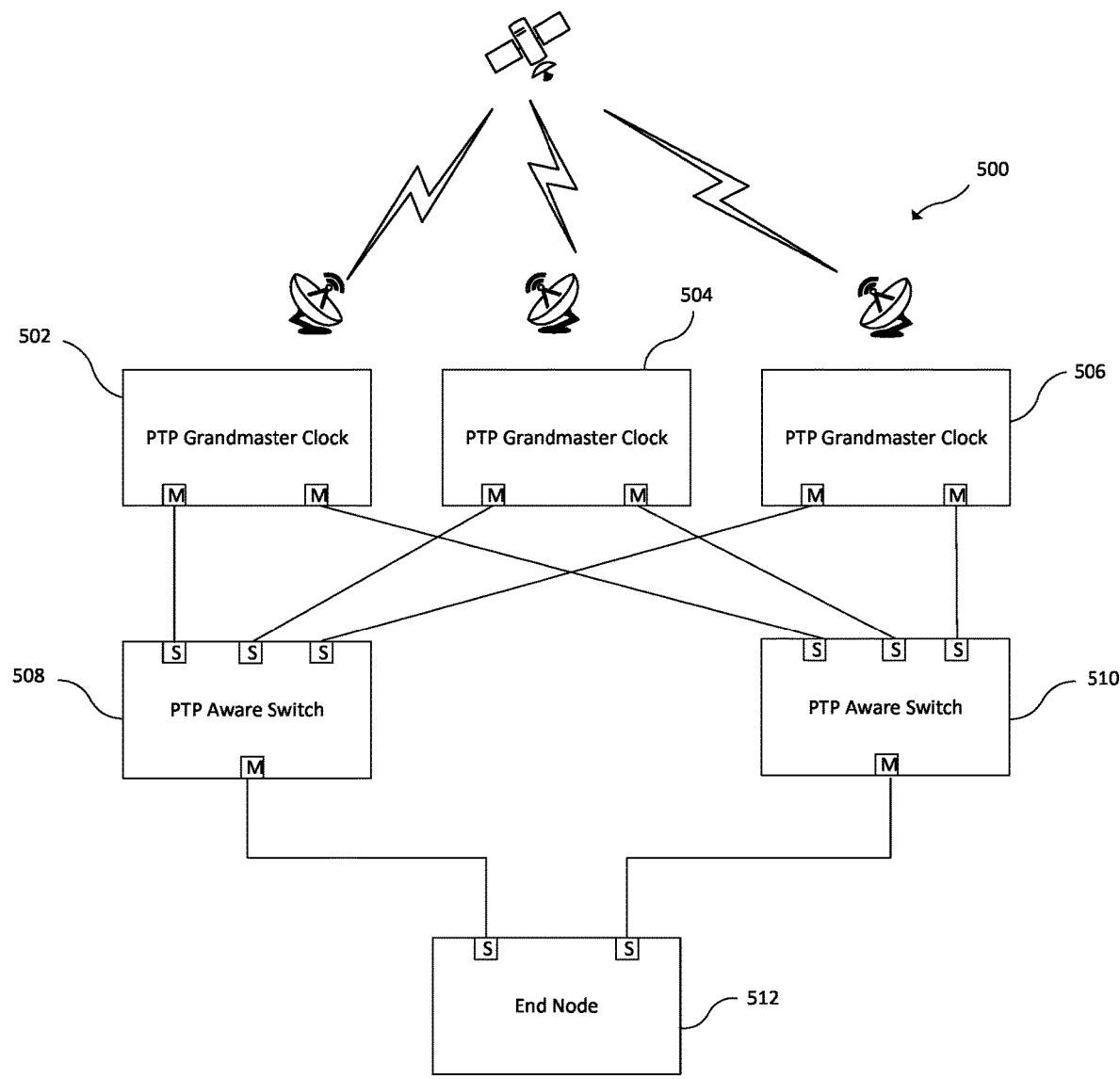
FIG. 5 shows another example of a redundant architecture for a PTP network for a satellite communication system.

The PTP network of FIGS. 3 and 4A-4D have a redundancy architecture that includes two PTP grandmaster clocks and two PTP aware switches. In other embodiments, different redundant architecture configurations may be utilized including more than two PTP grandmaster clocks and/or more than two PTP aware switches. FIG. 5 shows an example of a redundant architecture for a PTP network 500 that includes three PTP grandmaster clocks 502, 504, 506 and two PTP aware switches 508, 510 for providing timing synchronization for an end node 512. In the embodiment of FIG. 5, each PTP aware switch 508, 510 includes an input port for each PTP grandmaster clock 502, 504, 506. Thus, each PTP aware switch 508, 510 includes three input ports. Each input port is coupled to receive timing information from a different one of the PTP grandmaster clocks 502, 504, 506.

Figure 6:
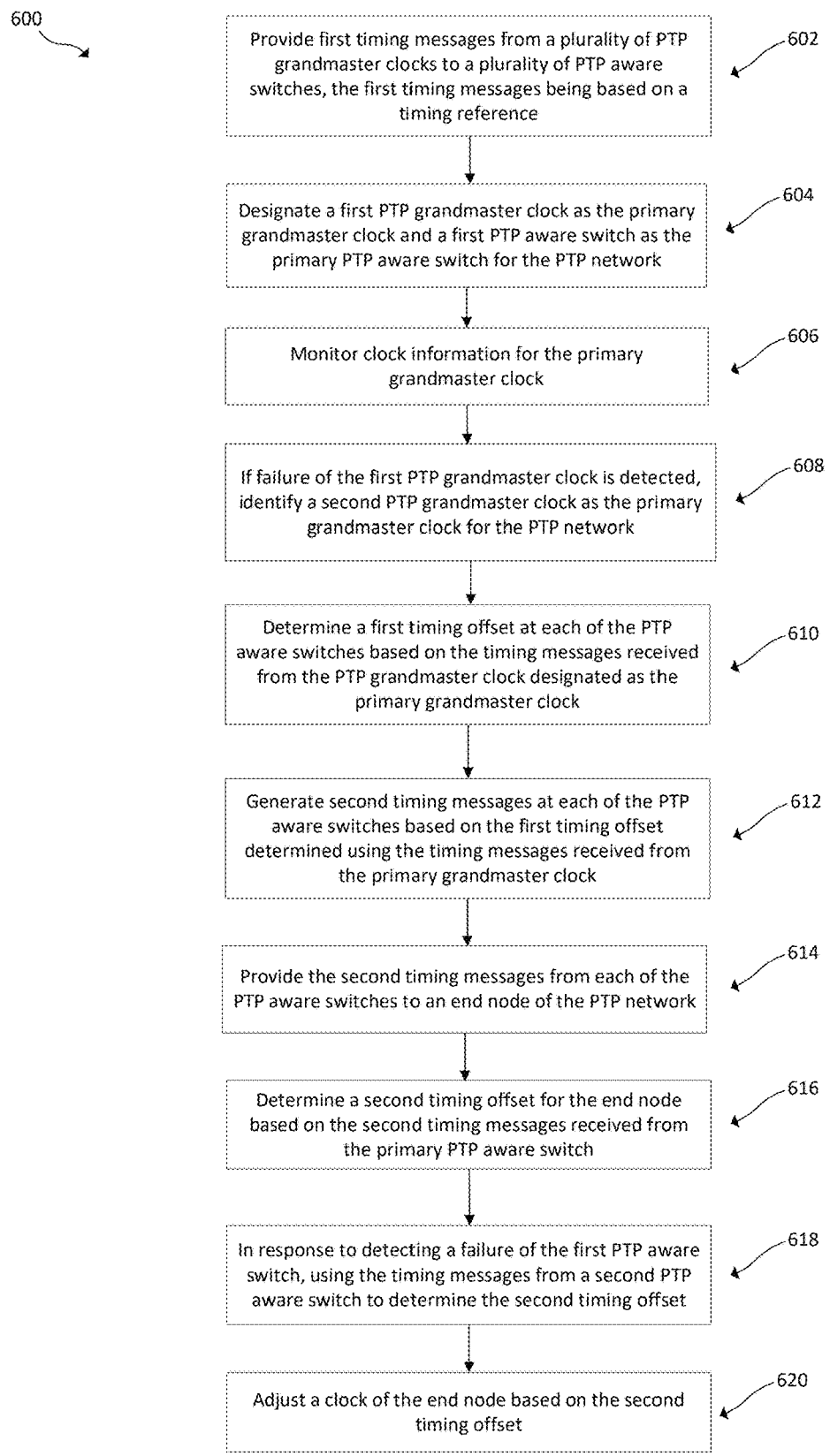
FIG. 6 shows an example method of synchronizing an end node with a grandmaster clock using a PTP network having a redundant architecture in accordance with this disclosure.

FIG. 6 shows a flowchart of an exemplary synchronization process 600 for a PTP network having a redundant architecture in accordance with this disclosure. The method begins with providing first timing messages from each of a plurality of PTP grandmaster clocks to each of a plurality of PTP aware switches (block 602). The first timing messages are each based on the same timing reference (e.g., the same GPS satellite time). One of the PTP grandmaster clocks is designated a primary grandmaster clock, and one of the PTP aware switches is designated a primary PTP aware switch for the PTP network (block 604). The clock information for the primary PTP grandmaster clock is monitored to detect failures of the primary PTP grandmaster clock (block 606). If a failure of the primary PTP grandmaster clock is detected, a second PTP grandmaster clock is identified as the primary grandmaster clock for the PTP network (block 608).

Each of the PTP aware switches determines a respective first timing offset based on the first timing messages received from the primary grandmaster clock (block 610) and generates second timing messages based on the first timing offset (block 612). The second timing messages from each of the PTP aware switches are provided to an end node of the PTP network, such as an inroute or outroute component of a modem or server (block 614). The end node determines a second timing offset based on the second timing messages received from the primary PTP aware switch (block 616). If a failure of the primary PTP aware switch is detected, the second timing messages received from a second PTP aware switch are used to determine the second timing offset (block 618). The clock of the end node is adjusted based on the second timing offset (block 620).

Figure 7A:
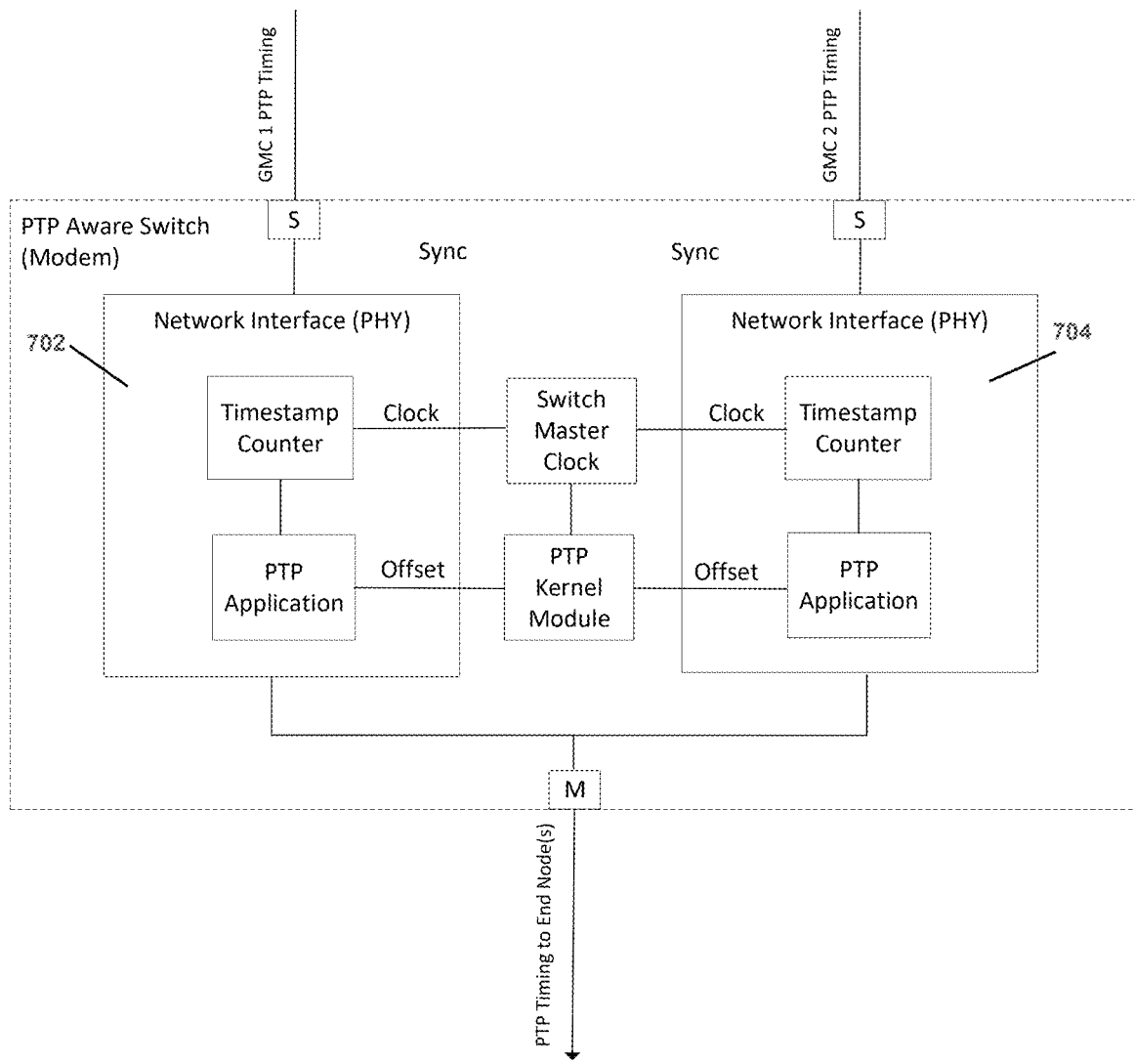
FIG. 7A is a diagram of one exemplary embodiment of a PTP aware switch.

Referring now to FIG. 7A, an example implementation of a PTP aware switch is shown. The PTP aware switch 700 includes two network interfaces 702, 704 (also referred to as PHYs) and a switch master clock. Each network interface 702, 704 includes a timestamp counter that is driven based on a frequency reference provided by the switch master clock. In embodiments, the switch master clock comprises an oscillator that provides the frequency reference for the timestamp counters. In one implementation, the switch master clock comprises an external programmable oscillator (e.g., AD9545). As can be seen in FIG. 7A, the network interface 702 receives a PTP timing reference from a first GMC (e.g., GMC 1), and the network interface 704 receives a PTP timing reference from a second GMC (e.g., GMC 2).

During operation, one of the two LAN interfaces is designated as the active (or primary) LAN interface and the other LAN interface is designated as the standby LAN interface for the switch. The PTP aware switch includes a PTP application for determining a timing offset which is the difference between the timing reference provided by the GMC and the timestamp of the LAN interface (also referred to as drift, timing error, and the like). In the embodiment of FIG. 7A, the PTP aware switch includes a first PTP application for determining the PTP timing offset for the network interface 702 based on the PTP timing reference received from GMC 1 and a second PTP application for determining the PTP timing offset for the network interface 704 based on the PTP timing reference received from GMC 2.

The network interfaces attach timestamps to PTP message packet frames for the PTP entry message packet that comes from the primary GMC and PTP exit packet that goes to the primary GMC for path delay and time error calculations. The timestamp counter for the active LAN interface provides the timestamp for the purposes of path delay and time error calculations. In embodiments, the timestamp counters comprise International Atomic Time (TAI) timestamp counter. The goal of PTP synchronization is to maintain this counter as close as possible to the number of nanoseconds since New Year of 1970, aka TAI epoch, as counted by the GMC (e.g., GPS receiver). The timestamp counters are driven by an oscillator (i.e., switch master clock). The switch master clock provides frequency reference to all the hardware components of the PTP aware switch. In embodiments, the switch master clock operates at a nominal frequency of 125 MHz and is adjustable up or down in predetermined increments. In embodiments, every cycle of the switch master clock causes the timestamp counter in the PHY to increase by 8.

During an initial setup (e.g., when the switch is powered up), the timestamp counter of each network interface is set to zero. The PTP application determines that its timer is some large number of nanoseconds behind the PTP timing reference from the GMC. PTP sends a command to the PHY, telling it to add the nanoseconds by stepping its time counter. Now the clock in the PHY is in sync with the master clock. Once the initial sync is achieved, the PTP application periodically measures the offset of the timestamp counter relative to the timing reference. If the timestamp counter begins to drift, the PTP application sends a command to the switch master clock to adjust the frequency up or down, as appropriate, to compensate for the drift. In the embodiment of FIG. 7A, the PTP aware switch includes a PTP kernel module for adjusting the frequency reference generated by the switch master clock. In the embodiment of FIG. 7A, the PTP kernel module utilizes the timing offset provided by the PTP application associated with the active LAN interface to update the frequency of the switch master clock. In the event of a failure of the primary GMC and/or the active LAN interface, the standby LAN interface is designated the active LAN interface and is used to provide the timing offset for adjusting the frequency of the switch master clock.

When a switchover, or failover, occurs, it can take time (e.g., several seconds) to achieve an initial synchronization of the timestamp counter of the standby network interface with the GMC if the standby timestamp counter has to be synchronized after failover. This delay can result in partial outage of the physical layer and inroute/outroute packet loss. To minimize the amount of time it takes to synchronize the standby timestamp counter after failover, the standby counter is maintained in synchronization with the PTP timing reference to enable a nearly hitless switch in terms of the inroute/outroute physical layer packet loss. Synchronization of the standby counter may be achieved in different ways. One method of synchronizing the standby timestamp counter with the PTP timing reference is a software method which is shown in FIG. 7A. A separate PTP application is associated with each network interface which maintains the timestamp counter of the associated interface in sync with the PTP timing reference received at that interface.

Figure 7B:
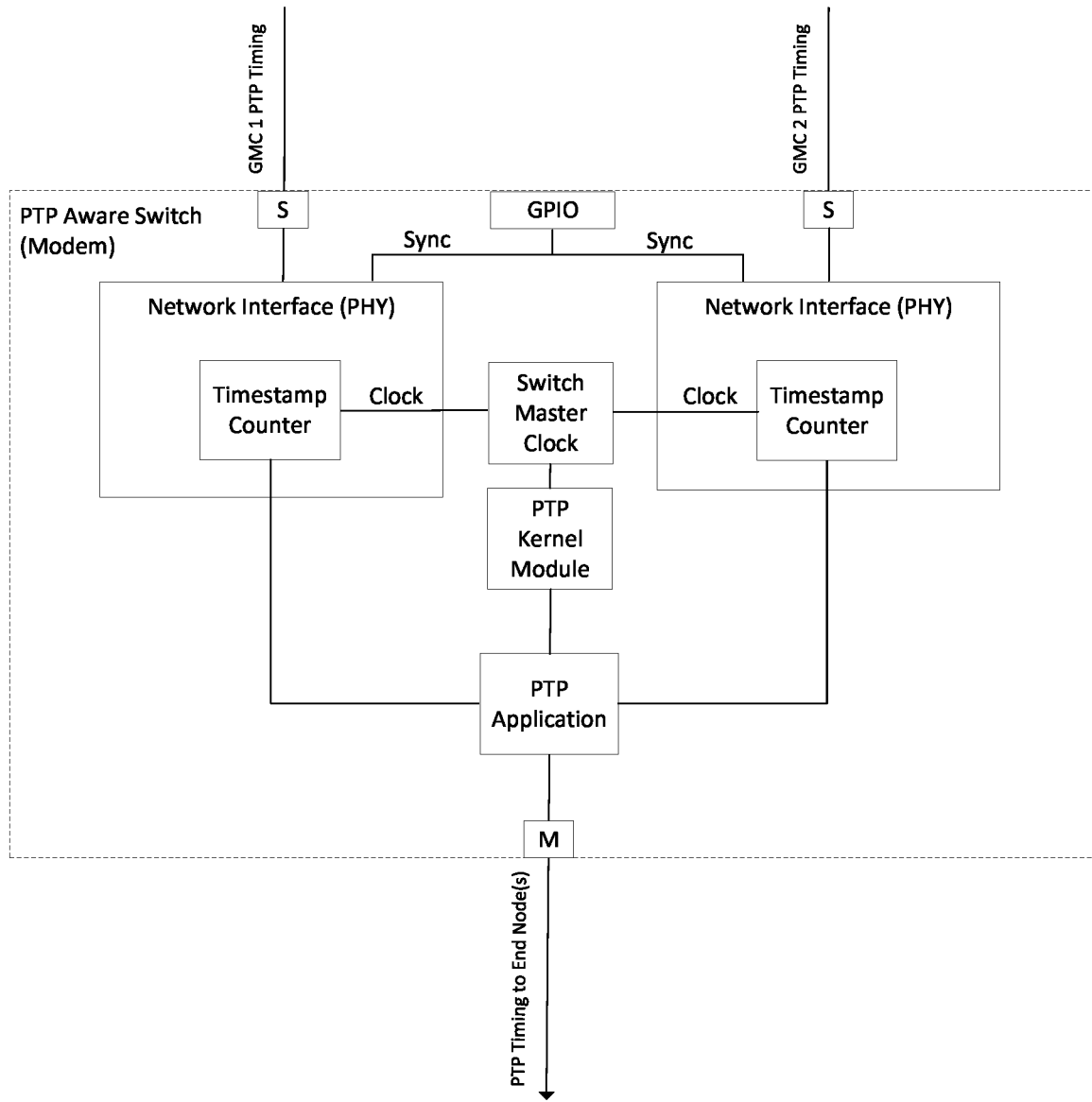

Another method of synchronizing a standby timestamp counter with PTP timing reference utilizes a hardware technique to maintain the two network interfaces of the PTP aware switch in lockstep with each other. An embodiment of a PTP aware switch having a lockstep hardware infrastructure is shown in FIG. 7B. In this implementation, each network interface receives a PTP reset input for receiving a PTP reset signal that causes the timestamp counter of the interface to be set to zero. As shown in FIG. 7B, the reset inputs are each connected to a single general-purpose input/output (GPIO) pin that provides the PTP reset signal at startup. In this implementation, a single PTP application is used to determine the timing offset for the PTP aware switch. The PTP aware switch receives the count from the timestamp counter of the active network interface and determines the timing offset based on the PTP timing reference received by the active LAN interface. Meanwhile, the timestamp counter of the standby interface is maintained in lockstep with the timestamp counter of the active LAN interface. Because both interfaces are driven by the same oscillator providing frequency reference, frequency changes commanded by the PTP kernel module affect both timestamp counters the same. Similarly, any commands to adjust a timestamp counter are provided to both timestamp counters. The timestamp counter of the standby network interface is therefore kept in synchronization with the PTP timing reference provided by the primary GMC. A fault or failure of the active network interface or degradation of the clock as measured by the offset (e.g., offset greater than a threshold value) triggers an automatic switchover to the standby network interface which is then designated the active interface for the switch.

Figure 8A:
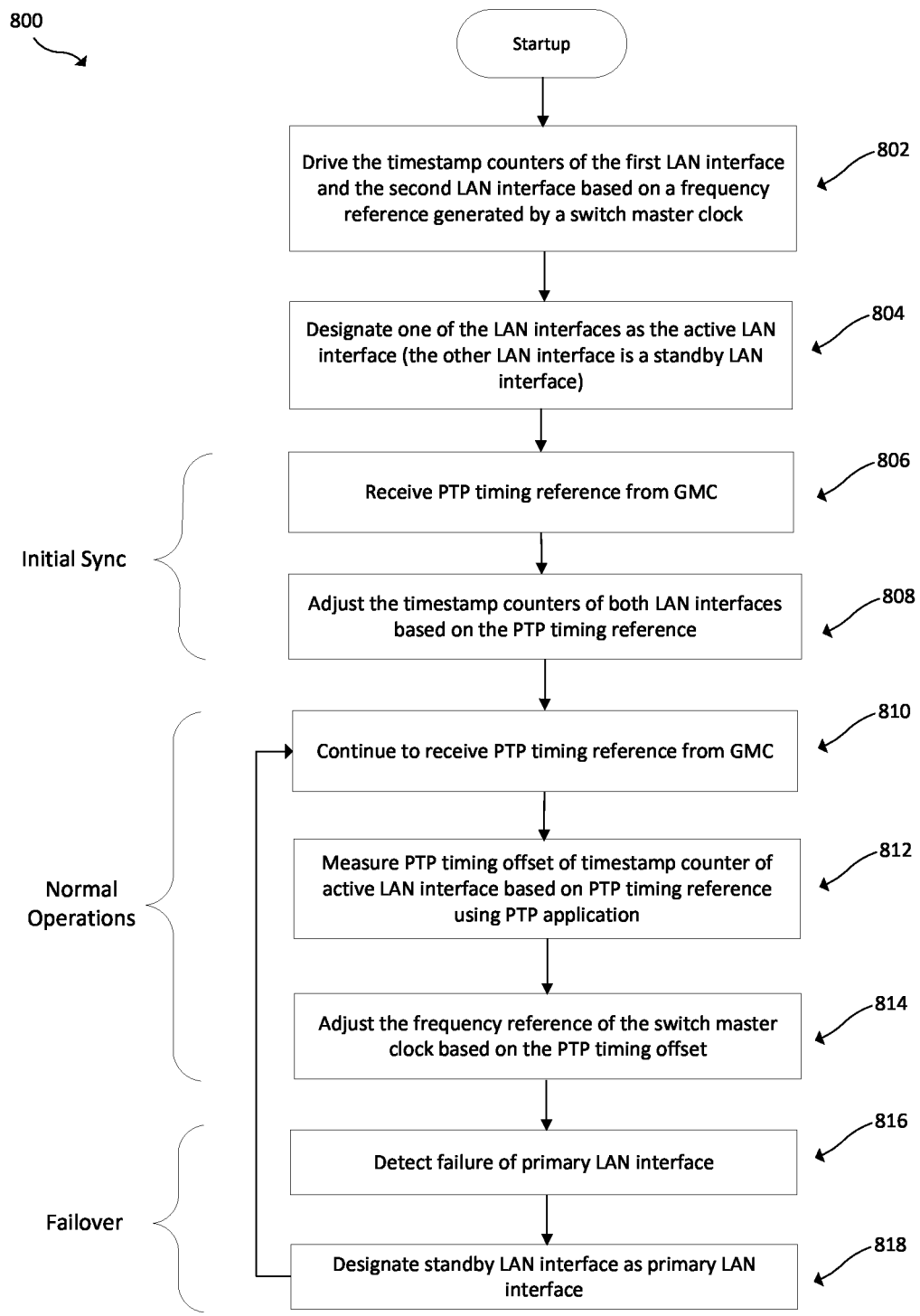
FIGS. 8A-8C show example methods of maintaining a standby interface of a PTP aware switch in synchronization with a grandmaster clock.

FIG. 8A shows an example method 800 of maintaining a standby LAN interface of a PTP aware switch synchronized with a PTP timing reference provided by a GMC. The method begins with starting up (e.g., powering up) the PTP aware switch which causes the timestamp counters of the two LAN interfaces to be driven based on a frequency reference generated by a switch master clock of the PTP aware switch (block 802). One of the LAN interfaces is designated the active LAN interface while the other LAN interface is the standby interface for the PTP aware switch (block 804). An initial sync is then performed in which a PTP timing reference is received (e.g., via one or both of the active and the standby LAN interfaces) (block 806). The timestamp counters of both interfaces are then synchronized to the GMC using the PTP timing reference.

After the initial sync, normal operations of the PTP aware switch are then performed. A PTP timing reference is received from a GMC (block 810), a PTP timing offset is then measured based on the timestamp counter of the active LAN interface using a PTP application (block 812), and the frequency reference generated by the switch master clock is adjusted based on the timing offset. Meanwhile, the performance of the active LAN interface is monitored to detect faults and/or failures of the interface as well as degradation of the counter to that failover may be performed. When fault or failure of the active LAN interface or degradation of the counter is detected (block 816), the standby LAN interface is designated the active LAN interface for the PTP aware switch (block 818).

Figure 8B:
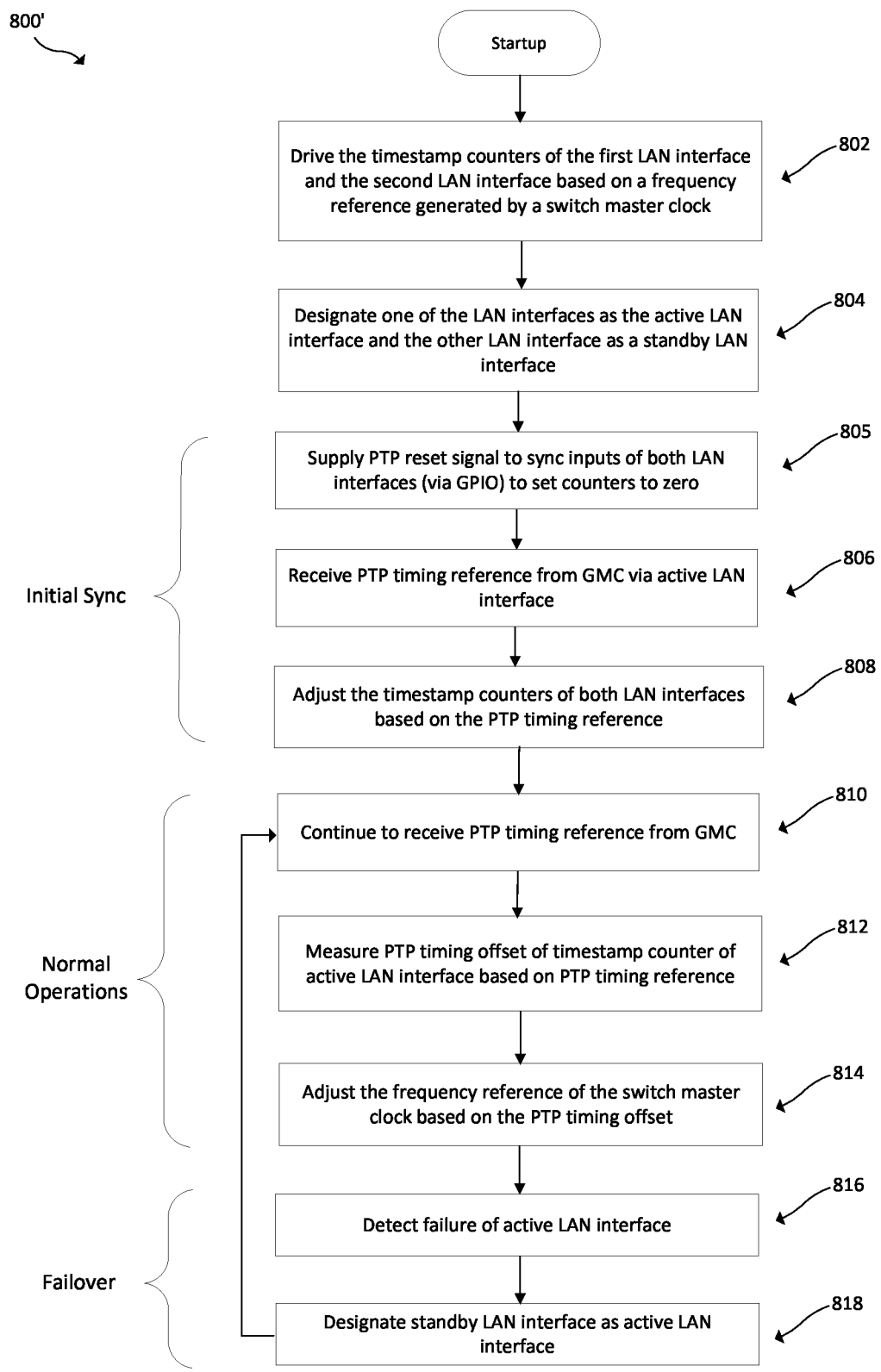

FIG. 8B shows an example method 800' of maintaining a standby LAN interface of a PTP aware switch synchronized with a PTP timing reference provided by a GMC when the PTP aware switch has a lockstep hardware infrastructure as shown in FIG. 7B. The method 800' includes many of the same steps as the method 800 of FIG. 8A (and have the same reference numerals). In this method, the initial sync includes a step 805 in which are PTP reset signal is supplied to the sync inputs of the timestamp counters of both interfaces. As a result, both counters are set to zero. The timestamp counters are then adjusted based on the PTP timing reference received from the GMC (block 808). In this example, the timestamp counters of both interfaces are adjusted based on the timing reference received by the active LAN interface. Because both interfaces are driven by the same oscillator providing frequency reference, frequency changes commanded by the PTP kernel module affect both timestamp counters the same. The timestamp counters of both interfaces are therefore maintained in lockstep with each other.

Figure 8C:
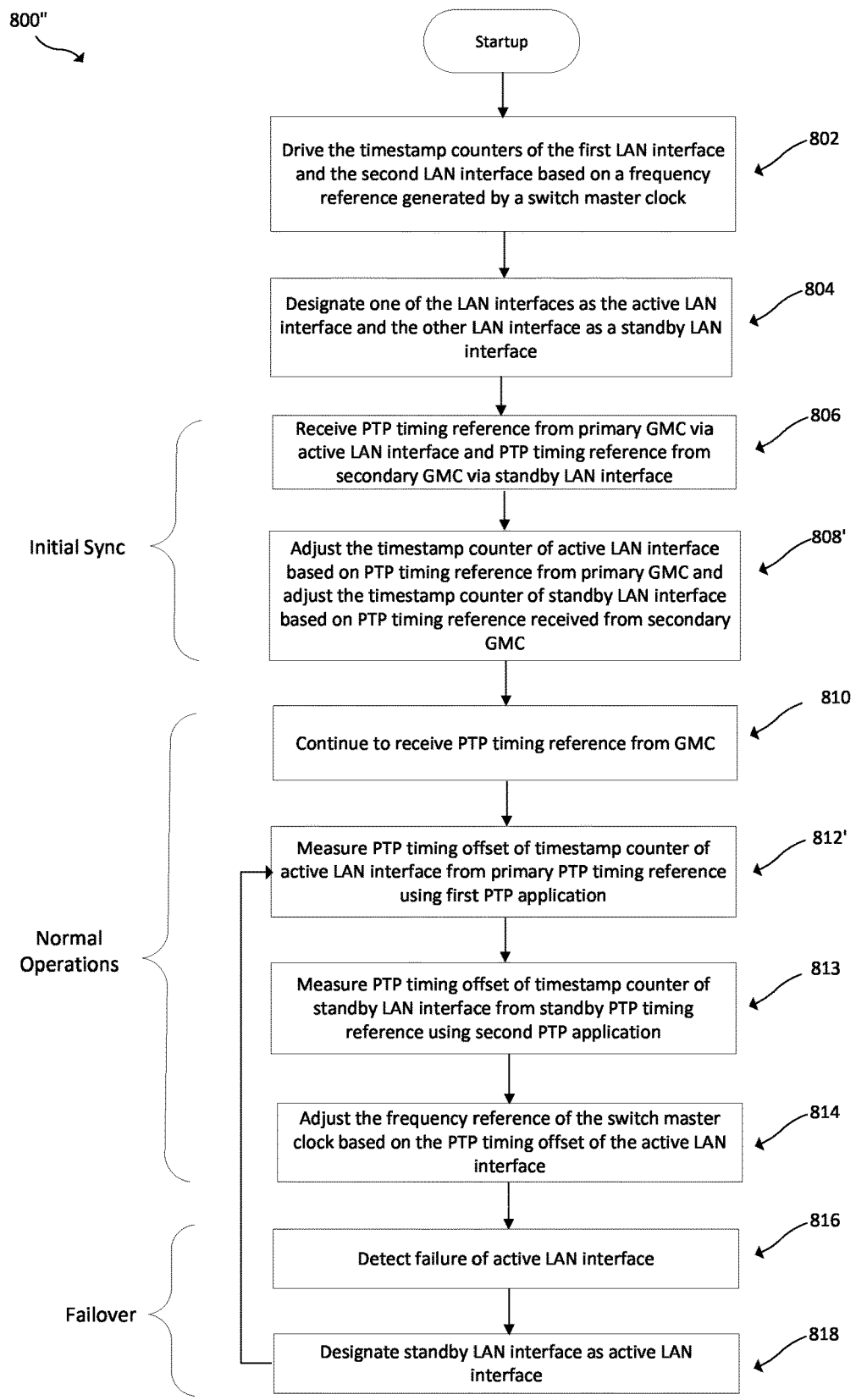

FIG. 8C shows an example method 800" of maintaining a standby LAN interface of a PTP aware switch synchronized with a PTP timing reference provided by a GMC when the PTP aware switch has configuration as shown in FIG. 7A that enables software synchronization techniques to be used. The method 800" includes many of the same steps as the method 800 of FIG. 8A (and have the same reference numerals). The method 800" includes the method step 808' during the initial sync in which the timestamp counter of the active LAN interface is adjusted based on the PTP timing reference from the primary GMC (i.e., PTP timing reference received via the active interface), and the timestamp counter of the standby LAN interface is adjusted based on the PTP timing reference received from the secondary GMC (i.e., PTP timing reference received via the standby interface). During normal operations, the PTP timing offset of the timestamp counter of the active interface is measured using a first PTP application (block 812'), and the PTP timing offset of the timestamp counter of the standby interface is measured using a second PTP application (block 813). The frequency reference of the switch master clock is adjusted based on the PTP timing offset of the active LAN interface (block 814).

Figure 9:
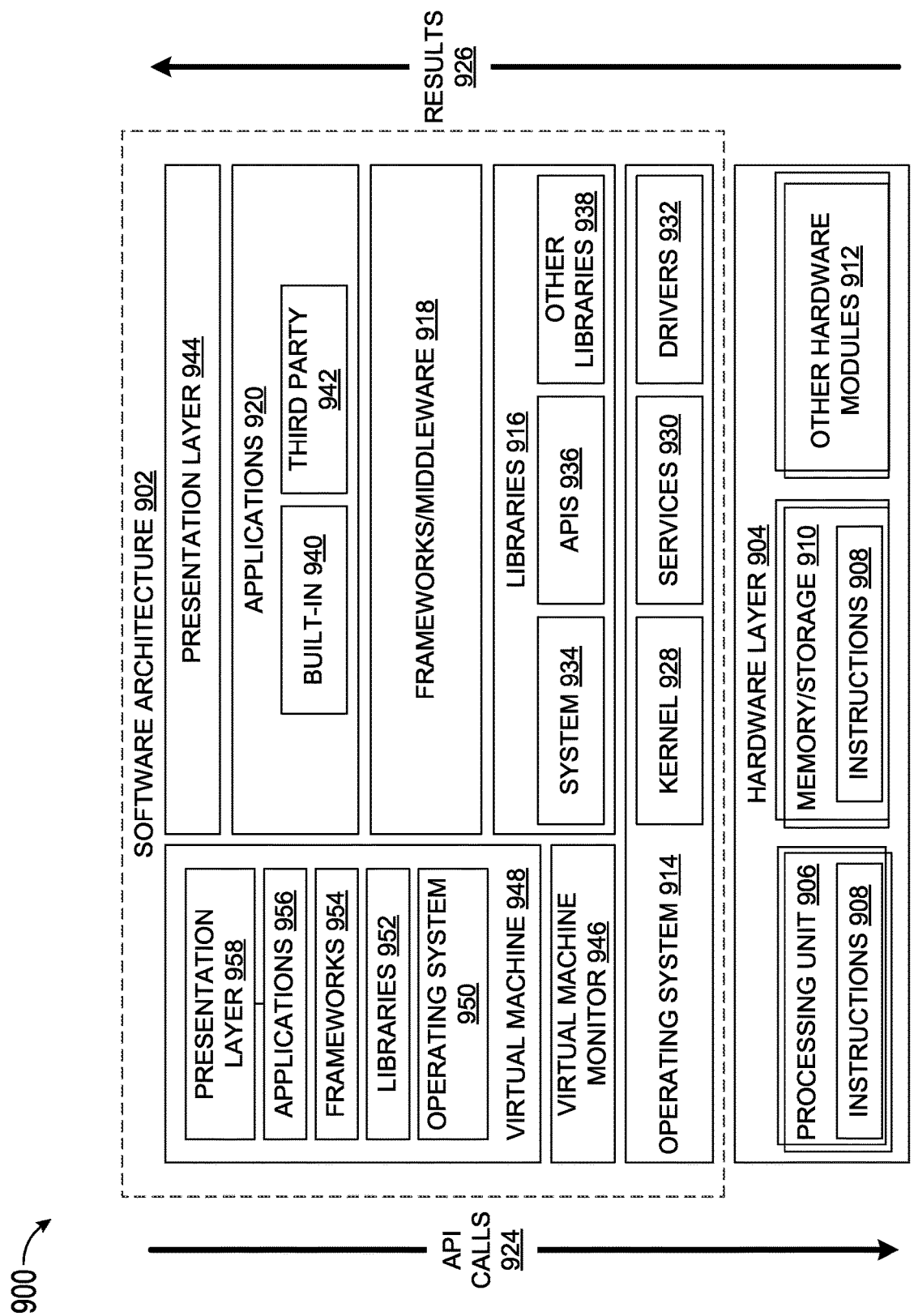
FIG. 9 is a block diagram illustrating an example software architecture, various portions of which may be used in conjunction with various hardware architectures herein described, which may implement any of the features herein described.

FIG. 9 is a block diagram 900 illustrating an example software architecture 902, various portions of which may be used in conjunction with various hardware architectures herein described, which may implement any of the above-described features. FIG. 9 is a non-limiting example of a software architecture and it will be appreciated that many other architectures may be implemented to facilitate the functionality described herein. The software architecture 902 may execute on hardware such as a machine 1000 of FIG. 10 that includes, among other things, processors 1010, memory 1030, and input/output (I/O) components 1050. A representative hardware layer 904 is illustrated and can represent, for example, the machine 1000 of FIG. 10. The representative hardware layer 904 includes a processing unit 906 and associated executable instructions 908. The executable instructions 908 represent executable instructions of the software architecture 902, including implementation of the methods, modules and so forth described herein. The hardware layer 904 also includes a memory/storage 910, which also includes the executable instructions 908 and accompanying data. The hardware layer 904 may also include other hardware modules 912. Instructions 908 held by processing unit 908 may be portions of instructions 908 held by the memory/storage 910.

The example software architecture 902 may be conceptualized as layers, each providing various functionality. For example, the software architecture 902 may include layers and components such as an operating system (OS) 914, libraries 916, frameworks 918, applications 920, and a presentation layer 944. Operationally, the applications 920 and/or other components within the layers may invoke API calls 924 to other layers and receive corresponding results 926. The layers illustrated are representative in nature and other software architectures may include additional or different layers. For example, some mobile or special purpose operating systems may not provide the frameworks/middleware 918.

The OS 914 may manage hardware resources and provide common services. The OS 914 may include, for example, a kernel 928, services 930, and drivers 932. The kernel 928 may act as an abstraction layer between the hardware layer 904 and other software layers. For example, the kernel 928 may be responsible for memory management, processor management (for example, scheduling), component management, networking, security settings, and so on. The services 930 may provide other common services for the other software layers. The drivers 932 may be responsible for controlling or interfacing with the underlying hardware layer 904. For instance, the drivers 932 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 916 may provide a common infrastructure that may be used by the applications 920 and/or other components and/or layers. The libraries 916 typically provide functionality for use by other software modules to perform tasks, rather than rather than interacting directly with the OS 914. The libraries 916 may include system libraries 934 (for example, C standard library) that may provide functions such as memory allocation, string manipulation, file operations. In addition, the libraries 916 may include API libraries 936 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 916 may also include a wide variety of other libraries 938 to provide many functions for applications 920 and other software modules.

The frameworks 918 (also sometimes referred to as middleware) provide a higher-level common infrastructure that may be used by the applications 920 and/or other software modules. For example, the frameworks 918 may provide various graphic user interface (GUI) functions, high-level resource management, or high-level location services. The frameworks 918 may provide a broad spectrum of other APIs for applications 920 and/or other software modules.

The applications 920 include built-in applications 940 and/or third-party applications 942. Examples of built-in applications 940 may include, but are not limited to, a contacts application, a browser application, a location application, a media application, a messaging application, and/or a game application. Third-party applications 942 may include any applications developed by an entity other than the vendor of the particular platform. The applications 920 may use functions available via OS 914, libraries 916, frameworks 918, and presentation layer 944 to create user interfaces to interact with users.

Some software architectures use virtual machines, as illustrated by a virtual machine 948. The virtual machine 948 provides an execution environment where applications/modules can execute as if they were executing on a hardware machine (such as the machine 1000 of FIG. 10, for example). The virtual machine 948 may be hosted by a host OS (for example, OS 914) or hypervisor, and may have a virtual machine monitor 946 which manages operation of the virtual machine 948 and interoperation with the host operating system. A software architecture, which may be different from software architecture 902 outside of the virtual machine, executes within the virtual machine 948 such as an OS 914, libraries 952, frameworks 954, applications 956, and/or a presentation layer 958.

Figure 10:
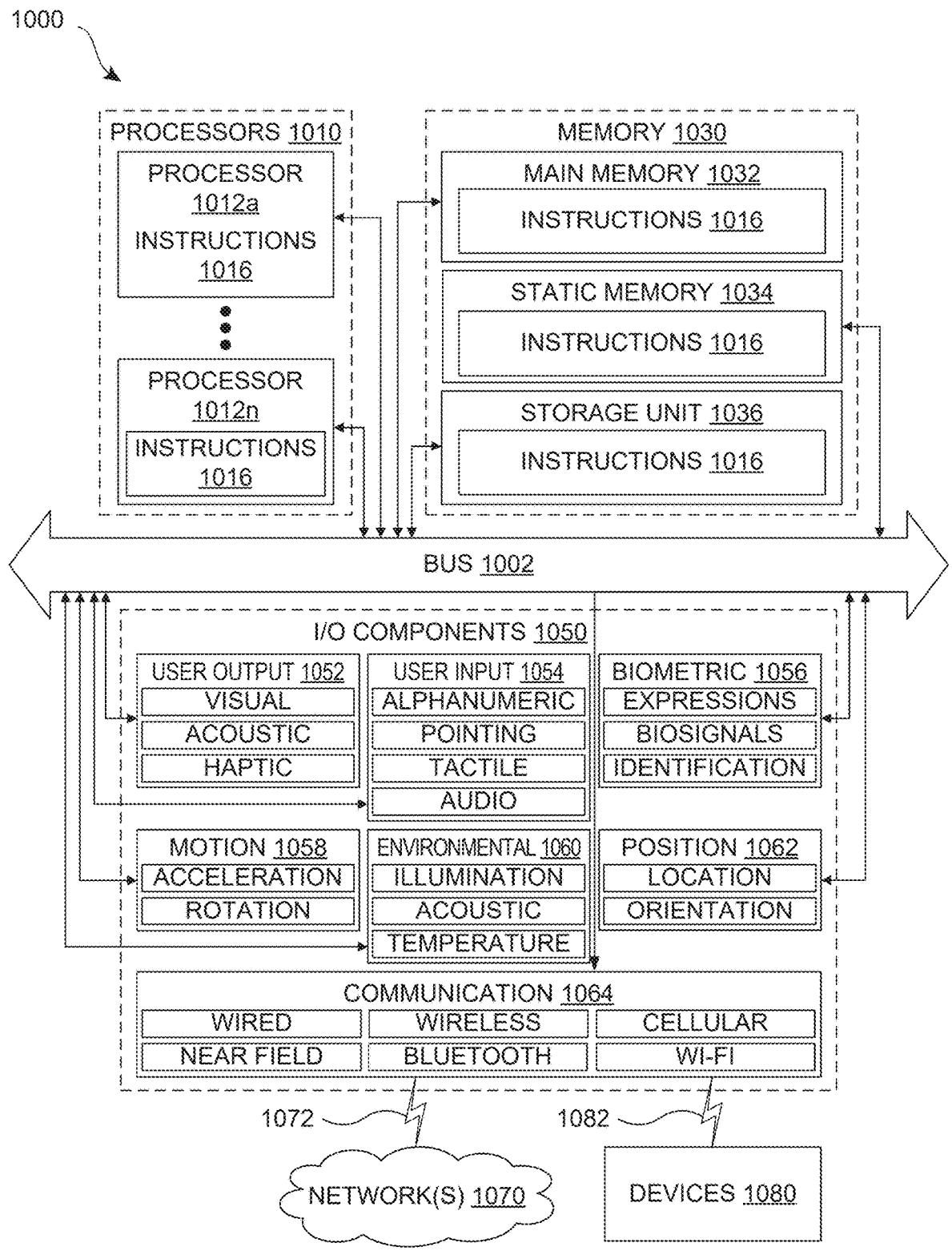
FIG. 10 is a block diagram illustrating components of an example machine configured to read instructions from a machine-readable medium and perform any of the features described herein.

FIG. 10 is a block diagram illustrating components of an example machine 1000 configured to read instructions from a machine-readable medium (for example, a machine-readable storage medium) and perform any of the features described herein. The example machine 1000 is in a form of a computer system, within which instructions 1016 (for example, in the form of software components) for causing the machine 1000 to perform any of the features described herein may be executed. As such, the instructions 1016 may be used to implement modules or components described herein. The instructions 1016 cause unprogrammed and/or unconfigured machine 1000 to operate as a particular machine configured to carry out the described features. The machine 1000 may be configured to operate as a standalone device or may be coupled (for example, networked) to other machines. In a networked deployment, the machine 1000 may operate in the capacity of a server machine or a client machine in a server-client network environment, or as a node in a peer-to-peer or distributed network environment. Machine 1000 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 1000 is illustrated, the term "machine" includes a collection of machines that individually or jointly execute the instructions 1016.

The machine 1000 may include processors 1010, memory 1030, and I/O components 1050, which may be communicatively coupled via, for example, a bus 1002. The bus 1002 may include multiple buses coupling various elements of machine 1000 via various bus technologies and protocols. In an example, the processors 1010 (including, for example, a central processing unit (CPU), a graphics processing unit (GPU), a digital signal processor (DSP), an ASIC, or a suitable combination thereof) may include one or more processors 1012a to 1012n that may execute the instructions 1016 and process data. In some examples, one or more processors 1010 may execute instructions provided or identified by one or more other processors 1010. The term "processor" includes a multi-core processor including cores that may execute instructions contemporaneously. Although FIG. 10 shows multiple processors, the machine 1000 may include a single processor with a single core, a single processor with multiple cores (for example, a multi-core processor), multiple processors each with a single core, multiple processors each with multiple cores, or any combination thereof. In some examples, the machine 1000 may include multiple processors distributed among multiple machines.

The memory/storage 1030 may include a main memory 1032, a static memory 1034, or other memory, and a storage unit 1036, both accessible to the processors 1010 such as via the bus 1002. The storage unit 1036 and memory 1032, 1034 store instructions 1016 embodying any one or more of the functions described herein. The memory/storage 1030 may also store temporary, intermediate, and/or long-term data for processors 1010. The instructions 1016 may also reside, completely or partially, within the memory 1032, 1034, within the storage unit 1036, within at least one of the processors 1010 (for example, within a command buffer or cache memory), within memory at least one of I/O components 1050, or any suitable combination thereof, during execution thereof. Accordingly, the memory 1032, 1034, the storage unit 1036, memory in processors 1010, and memory in I/O components 1050 are examples of machine-readable media.

As used herein, "machine-readable medium" refers to a device able to temporarily or permanently store instructions and data that cause machine 1000 to operate in a specific fashion, and may include, but is not limited to, random-access memory (RAM), read-only memory (ROM), buffer memory, flash memory, optical storage media, magnetic storage media and devices, cache memory, network-accessible or cloud storage, other types of storage and/or any suitable combination thereof. The term "machine-readable medium" applies to a single medium, or combination of multiple media, used to store instructions (for example, instructions 1016) for execution by a machine 1000 such that the instructions, when executed by one or more processors 1010 of the machine 1000, cause the machine 1000 to perform and one or more of the features described herein. Accordingly, a "machine-readable medium" may refer to a single storage device, as well as "cloud-based" storage systems or storage networks that include multiple storage apparatus or devices. The term "machine-readable medium" excludes signals per se.

The I/O components 1050 may include a wide variety of hardware components adapted to receive input, provide output, produce output, transmit information, exchange information, capture measurements, and so on. The specific I/O components 1050 included in a particular machine will depend on the type and/or function of the machine. For example, mobile devices such as mobile phones may include a touch input device, whereas a headless server or IoT device may not include such a touch input device. The particular examples of I/O components illustrated in FIG. 10 are in no way limiting, and other types of components may be included in machine 1000. The grouping of I/O components 1050 are merely for simplifying this discussion, and the grouping is in no way limiting. In various examples, the I/O components 1050 may include user output components 1052 and user input components 1054. User output components 1052 may include, for example, display components for displaying information (for example, a liquid crystal display (LCD) or a projector), acoustic components (for example, speakers), haptic components (for example, a vibratory motor or force-feedback device), and/or other signal generators. User input components 1054 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 1050 may include biometric components 1056, motion components 1058, environmental components 1060, and/or position components 1062, among a wide array of other physical sensor components. The biometric components 1056 may include, for example, components to detect body expressions (for example, facial expressions, vocal expressions, hand or body gestures, or eye tracking), measure biosignals (for example, heart rate or brain waves), and identify a person (for example, via voice-, retina-, fingerprint-, and/or facial-based identification). The motion components 1058 may include, for example, acceleration sensors (for example, an accelerometer) and rotation sensors (for example, a gyroscope). The environmental components 1060 may include, for example, illumination sensors, temperature sensors, humidity sensors, pressure sensors (for example, a barometer), acoustic sensors (for example, a microphone used to detect ambient noise), proximity sensors (for example, infrared sensing of nearby objects), and/or other components that may provide indications, measurements, or signals corresponding to a surrounding physical environment. The position components 1062 may include, for example, location sensors (for example, a Global Position System (GPS) receiver), altitude sensors (for example, an air pressure sensor from which altitude may be derived), and/or orientation sensors (for example, magnetometers).

The I/O components 1050 may include communication components 1064, implementing a wide variety of technologies operable to couple the machine 1000 to network(s) 1070 and/or device(s) 1080 via respective communicative couplings 1072 and 1082. The communication components 1064 may include one or more network interface components or other suitable devices to interface with the network(s) 1070. The communication components 1064 may include, for example, components adapted to provide wired communication, wireless communication, cellular communication, Near Field Communication (NFC), Bluetooth communication, Wi-Fi, and/or communication via other modalities. The device(s) 1080 may include other machines or various peripheral devices (for example, coupled via USB).

In some examples, the communication components 1064 may detect identifiers or include components adapted to detect identifiers. For example, the communication components 1064 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 1062, such as, but not limited to, geo-location via Internet Protocol (IP) address, location via Wi-Fi, cellular, NFC, Bluetooth, or other wireless station identification and/or signal triangulation.

In the following, further features, characteristics and advantages of the invention will be described by means of items:

Item 1. A gateway for a satellite communication system, the gateway comprising:
at least one modem including an outroute modulator and an inroute demodulator, the outroute modulator and the inroute demodulator having a frequency and timing derived from a timing synchronization signal; and
a Precision Time Protocol (PTP) network for providing the timing synchronization signal to the at least one modem, the PTP network including:
a plurality of PTP grandmaster clocks that are each synchronized to a timing reference, each of the PTP grandmaster clocks generating first timing messages based on the timing reference, wherein a first PTP grandmaster clock of the plurality of PTP grandmaster clocks is designated as a primary grandmaster clock;
a plurality of PTP aware switches, each of the PTP aware switches being configured to:
receive the PTP timing messages from each of the PTP grandmaster clocks,
determine a respective first timing offset based on the PTP timing messages received from the primary grandmaster clock, and
generate second timing messages based on the first timing offset,
wherein a first PTP aware switch of the plurality of PTP aware switches is designated as a primary PTP aware switch; and a slave clock for the at least one modem that is configured to:
receive the second timing messages from each of the PTP aware switches;
determine a second timing offset for the slave clock based on the second timing messages received from the primary grandmaster clock; and
generate the timing synchronization signal for the at least one modem based on the second timing offset.

Item 2. The gateway of item 1, wherein the slave clock is incorporated into the at least one modem.

Item 3. The gateway of any of items 1-2, wherein:
a first PTP grandmaster clock is designated the primary PTP grandmaster clock,
each of the PTP grandmaster clocks is configured to detect a failure of the primary PTP grandmaster clock, and
in response to detecting a failure of the first PTP grandmaster clock, a second PTP grandmaster clock is identified as the primary PTP grandmaster clock.

Item 4. The gateway of any of items 1-3, wherein:
each of the PTP aware switches includes a respective input port for receiving the first timing messages from each of the PTP grandmaster clocks,
when the first PTP grandmaster clock is the primary PTP grandmaster clock, the respective input port associated with the first PTP grandmaster clock corresponds to a primary input port for each of the PTP aware switches, and
when the second PTP grandmaster clock is identified as the primary PTP grandmaster clock, the primary input is switched over to the respective input port associated with the second PTP grandmaster clock.

Item 5. The gateway of any of items 1-4, wherein:
a first PTP aware switch is designated the primary PTP aware switch,
the slave clock is configured to detect a failure of the primary PTP aware switch, and
in response to detecting the failure of the primary PTP aware switch, the slave clock is configured to switchover to using the second timing messages from a second PTP aware switch as a basis for determining the second timing offset.

Item 6. The gateway of any of items 1-5, wherein the second timing messages received from the first PTP aware switch are received at a first input port of the slave clock and the second timing messages from the second PTP aware switch are received at a second input port of the slave clock,
wherein, when the first PTP aware switch is the primary PTP aware switch, the first input port is a primary input for the slave clock, and
wherein, when the failure of the primary PTP aware switch is detected, the primary input port is switched over to the second input port of the slave clock.

Item 7. The gateway of any of items 1-6, wherein the timing reference for the plurality of PTP grandmaster clocks comprises a GPS constellation time provided by a GPS satellite.

Item 8. A method for synchronizing an end node of a PTP network with a grandmaster clock, the method comprising:
providing first timing messages from each of a plurality of PTP grandmaster clocks to each of a plurality of PTP aware switches, the first timing messages each being based on a timing reference, wherein a first PTP grandmaster clock of the plurality of PTP grandmaster clocks is designated as a primary PTP grandmaster clock and a first PTP aware switch of the PTP aware switches is designated as a primary PTP aware switch;
monitoring clock information of the primary PTP grandmaster clock to detect a failure of the primary grandmaster clock;
in response to detecting the failure of the primary grandmaster clock, identifying a second PTP grandmaster clocks of the PTP grandmaster clocks as the primary PTP grandmaster clock;
determining a respective first timing offset at each of the PTP aware switches based on the first timing messages received from the primary PTP grandmaster clock;
generating second timing messages at each of the PTP aware switches based on the respective first timing offset;
providing the second timing messages to the end node;
detecting a failure of the first PTP aware switch at the end node;
in response to detecting the failure of the first PTP aware switch, identifying a second PTP aware switch as the primary PTP aware switch; and
determining a second timing offset at the end node based on the second timing messages received from the primary PTP aware switch.

Item 9. The method of item 8, wherein the end node comprises an inroute component and/or an outroute component of a modem or a server of a gateway for a satellite communication network.

Item 10. The method of any of items 1-8, wherein the clock information is monitored by each of the PTP grandmaster clocks to detect the failure of the primary PTP grandmaster clock.

Item 11. The method of any of items 1-10, wherein the second PTP grandmaster clock detects the failure of the first PTP grandmaster clock and then identifies itself as the primary PTP grandmaster clock.

Item 12. The method of any of items 1-11, wherein:
the first timing messages from the first PTP grandmaster clock are received at a first input port of each of the PTP aware switches, and the first timing messages from the second PTP grandmaster clock are received at a second input port of each of the PTP aware switches,
when the first PTP grandmaster clock is the primary PTP grandmaster clock, the first input port of each of the PTP aware switches is a primary input port for each of the PTP aware switches, and
in response to the second PTP grandmaster clock being identified as the primary PTP grandmaster clock, the primary input port of each of the PTP aware switches is switched over from the first input port to the second input port.

Item 13. The method of any of items 1-12, wherein:
the second timing messages received from the first PTP aware switch are received at a first input port of the end node and the second timing messages from the second PTP aware switch are received at a second input port of the end node,
wherein, when the first PTP aware switch is the primary PTP aware switch, the first input port is a primary input for the end node, and
wherein, when the failure of the first PTP aware switch is detected at the first input port, the primary input port is switched over to the second input port of the end node.

Item 14. The method of any of items 1-13, wherein the timing reference comprises a GPS constellation time provided by a GPS satellite.

Item 15. A method of maintaining a standby local area network (LAN) interface of a PTP aware switch synchronized with at least one PTP grandmaster clock (GMC), the method comprising:
driving a first timestamp counter of a first LAN interface and a second timestamp counter of a second LAN interface of the PTP aware switch based on a frequency reference generated by a switch master clock of the PTP aware switch, wherein the first LAN interface is initially an active LAN interface and the second LAN interface is the standby LAN interface;
performing an initial synchronization process that includes:
receiving a PTP timing reference from the at least one PTP GMC; and
synchronizing the first timestamp counter and the second timestamp counter with the PTP timing reference;
determining a timing offset based on the PTP timing reference and a timestamp of the active LAN interface using a PTP application; and
adjusting the frequency reference generated by the switch master clock based on the timing offset.

Item 16. The method of item 15,
detecting a fault of the first LAN interface;
in response to detecting the fault of the first LAN interface, designating the second LAN interface as the active LAN interface.

Item 17. The method of any of items 15-16, wherein the initial synchronization process further comprises:
supplying a PTP reset signal to the first LAN interface and the second LAN interfaces which sets the first timestamp counter and the second timestamp counter to zero.

Item 18. The method of any of items 15-17, wherein the first LAN interface and the second LAN interface each include a sync input that is connected to a common input pin, and
  wherein the PTP reset signal is supplied to the sync input of the first LAN interface and the sync input of the second LAN interface via the common input pin.

Item 19. The method of any of items 15-18, wherein the first LAN interface receives the PTP timing reference from a first GMC and the second LAN interface receives the PTP timing reference from a second GMC, wherein determining the timing offset further comprises:
  determining a first timing offset for the first LAN interface using a first PTP application and a second timing offset for the second LAN interface using a second PTP application;
  determining a second timing offset for the second LAN interface based on a time count of the second time counter and the first timing reference using a second PTP application;
  wherein the frequency reference is adjusted based on the first timing offset while the first LAN interface is the active LAN interface and is adjusted based on the second timing offset while the second LAN interface is the active LAN interface.

Item 20. The method of any of items 15-19, wherein the timestamp counter of the second LAN interface is synchronized to the PTP timing reference received from the second GMC.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A gateway for a satellite communication system, the gateway comprising:
  at least one modem including an outroute modulator and an inroute demodulator, the outroute modulator and the inroute demodulator having a frequency and timing derived from a timing synchronization signal; and
  a Precision Time Protocol (PTP) network for providing the timing synchronization signal to the at least one modem, the PTP network including:
    a plurality of PTP grandmaster clocks that are each synchronized to a timing reference, each of the PTP grandmaster clocks generating first timing messages based on the timing reference, wherein a first PTP grandmaster clock of the plurality of PTP grandmaster clocks is designated as a primary grandmaster clock;
    a plurality of PTP aware switches, each of the PTP aware switches being configured to:

receive the PTP timing messages from each of the PTP grandmaster clocks, determine a respective first timing offset based on the PTP timing messages received from the primary grandmaster clock, and generate second timing messages based on the first timing offset, wherein a first PTP aware switch of the plurality of PTP aware switches is designated as a primary PTP aware switch; and a slave clock for the at least one modem that is configured to:

receive the second timing messages from each of the PTP aware switches;

determine a second timing offset for the slave clock based on the second timing messages received from the primary grandmaster clock; and generate the timing synchronization signal for the at least one modem based on the second timing offset.

2. The gateway of claim 1, wherein the slave clock is incorporated into the at least one modem.

3. The gateway of claim 1, wherein:

a first PTP grandmaster clock is designated the primary PTP grandmaster clock, each of the PTP grandmaster clocks is configured to detect a failure of the primary PTP grandmaster clock, and in response to detecting a failure of the first PTP grandmaster clock, a second PTP grandmaster clock is identified as the primary PTP grandmaster clock.

4. The gateway of claim 3, wherein:

each of the PTP aware switches includes a respective input port for receiving the first timing messages from each of the PTP grandmaster clocks, when the first PTP grandmaster clock is the primary PTP grandmaster clock, the respective input port associated with the first PTP grandmaster clock corresponds to a primary input port for each of the PTP aware switches, and when the second PTP grandmaster clock is identified as the primary PTP grandmaster clock, the primary input is switched over to the respective input port associated with the second PTP grandmaster clock.

5. The gateway of claim 1, wherein:

a first PTP aware switch is designated the primary PTP aware switch, the slave clock is configured to detect a failure of the primary PTP aware switch, and in response to detecting the failure of the primary PTP aware switch, the slave clock is configured to switchover to using the second timing messages from a second PTP aware switch as a basis for determining the second timing offset.

6. The gateway of claim 5, wherein the second timing messages received from the first PTP aware switch are received at a first input port of the slave clock and the second timing messages from the second PTP aware switch are received at a second input port of the slave clock, wherein, when the first PTP aware switch is the primary PTP aware switch, the first input port is a primary input for the slave clock, and wherein, when the failure of the primary PTP aware switch is detected, the primary input port is switched over to the second input port of the slave clock.

7. The gateway of claim 1, wherein the timing reference for the plurality of PTP grandmaster clocks comprises a Global Positioning System (GPS) constellation time provided by a GPS satellite.

8. A method for synchronizing an end node of a Precision Time Protocol (PTP) network with a grandmaster clock, the method comprising:

providing first timing messages from each of a plurality of PTP grandmaster clocks to each of a plurality of PTP aware switches, the first timing messages each being based on a timing reference, wherein a first PTP grandmaster clock of the plurality of PTP grandmaster clocks is designated as a primary PTP grandmaster clock and a first PTP aware switch of the PTP aware switches is designated as a primary PTP aware switch;

monitoring clock information of the primary PTP grandmaster clock to detect a failure of the primary grandmaster clock;

in response to detecting the failure of the primary grandmaster clock, identifying a second PTP grandmaster clocks of the PTP grandmaster clocks as the primary PTP grandmaster clock;

determining a respective first timing offset at each of the PTP aware switches based on the first timing messages received from the primary PTP grandmaster clock;

generating second timing messages at each of the PTP aware switches based on the respective first timing offset;

providing the second timing messages to the end node;

detecting a failure of the first PTP aware switch at the end node;

in response to detecting the failure of the first PTP aware switch, identifying a second PTP aware switch as the primary PTP aware switch; and determining a second timing offset at the end node based on the second timing messages received from the primary PTP aware switch.

9. The method of claim 8, wherein the end node comprises an inroute component and/or an outroute component of a modem or a server of a gateway for a satellite communication network.

10. The method of claim 8, wherein the clock information is monitored by each of the PTP grandmaster clocks to detect the failure of the primary PTP grandmaster clock.

11. The method of claim 10, wherein the second PTP grandmaster clock detects the failure of the first PTP grandmaster clock and then identifies itself as the primary PTP grandmaster clock.

12. The method of claim 11, wherein:

the first timing messages from the first PTP grandmaster clock are received at a first input port of each of the PTP aware switches, and the first timing messages from the second PTP grandmaster clock are received at a second input port of each of the PTP aware switches, when the first PTP grandmaster clock is the primary PTP grandmaster clock, the first input port of each of the PTP aware switches is a primary input port for each of the PTP aware switches, and in response to the second PTP grandmaster clock being identified as the primary PTP grandmaster clock, the primary input port of each of the PTP aware switches is switched over from the first input port to the second input port.

13. The method of claim 8, wherein:

the second timing messages received from the first PTP aware switch are received at a first input port of the end node and the second timing messages from the second PTP aware switch are received at a second input port of the end node, wherein, when the first PTP aware switch is the primary PTP aware switch, the first input port is a primary input for the end node, and wherein, when the failure of the first PTP aware switch is detected at the first input port, the primary input port is switched over to the second input port of the end node.

14. The method of claim 8, wherein the timing reference comprises a Global Positioning System (GPS) constellation time provided by a GPS satellite.

* * * * *